July 13, 1937.　　E. P. BULLARD ET AL　　2,086,852
MACHINE TOOL
Filed Oct. 30, 1936　　9 Sheets-Sheet 1

INVENTORS:
EDWARD P. BULLARD
EDWARD C. BULLARD
EDWARD P. BULLARD III
GUSTAF R. APPELBERG
ERNEST H. JOHNSON
BY FRANK H. MUSSLER
ATTORNEY.

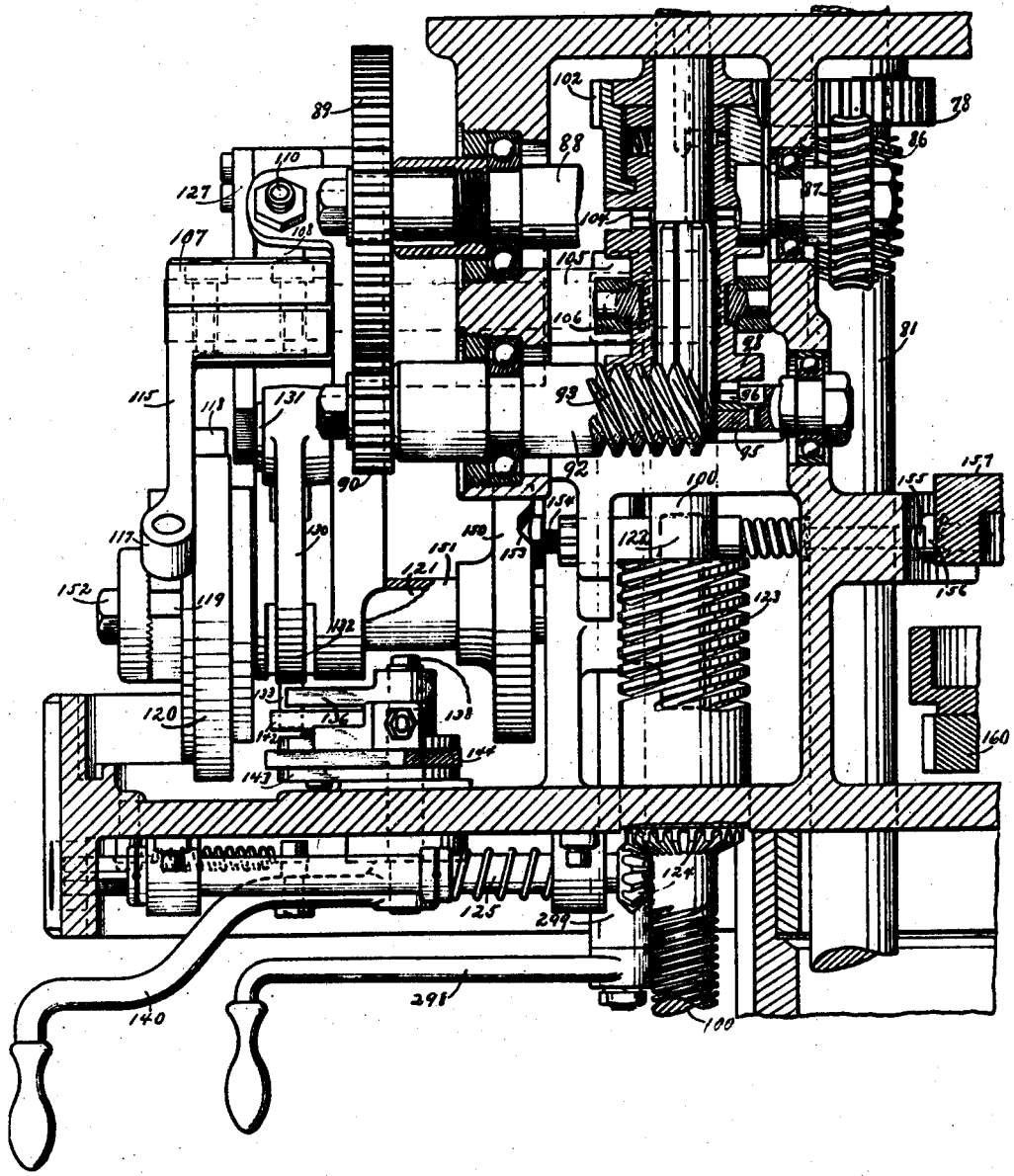

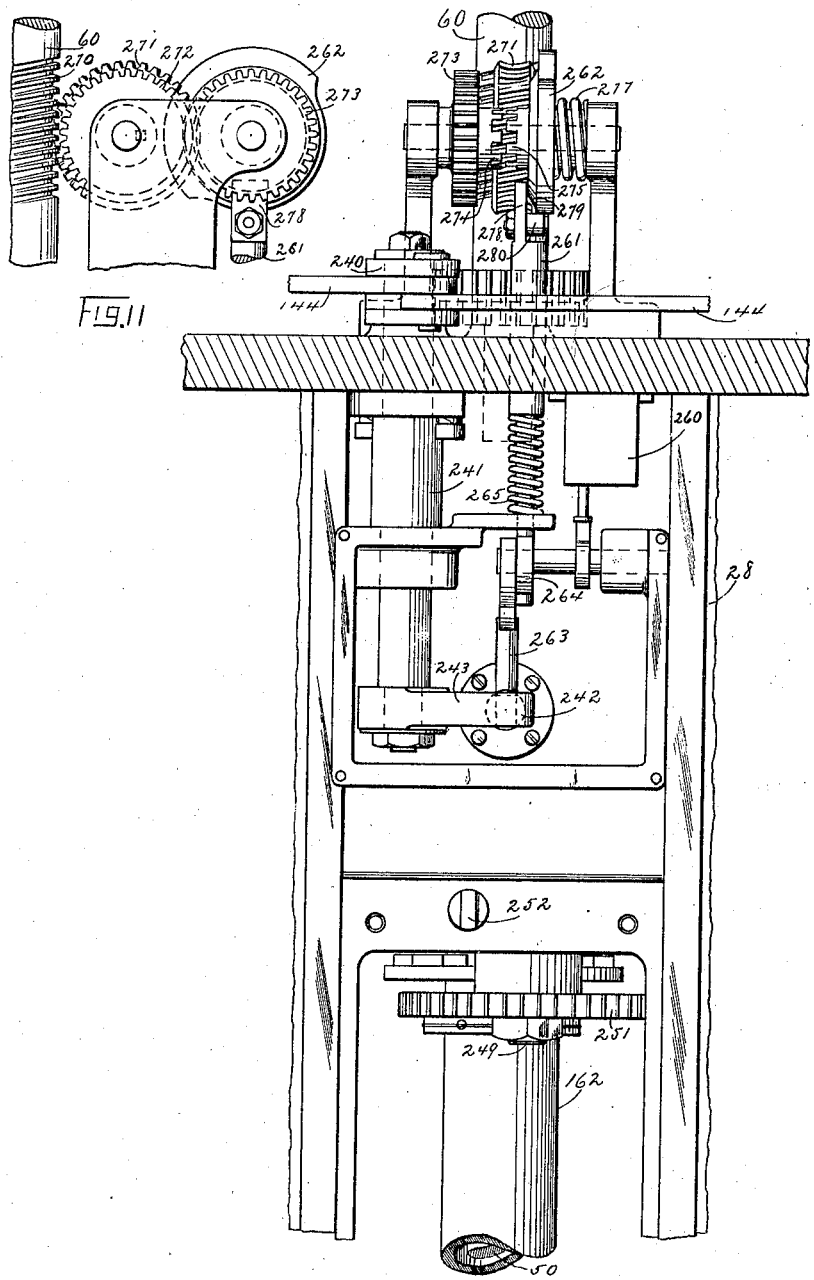

Patented July 13, 1937

2,086,852

UNITED STATES PATENT OFFICE 2,086,852

MACHINE TOOL

Edward P. Bullard, Edward C. Bullard, and Edward P. Bullard, III, Fairfield, Gustaf R. Appelberg and Ernest H. Johnson, Bridgeport, and Frank H. Mussler, Stratford, Conn., assignors to The Bullard Company, a corporation of Connecticut Application October 30, 1936, Serial No. 108,494

92 Claims. (Cl. 29—38)

This invention relates to machine tools and is particularly concerned with station type machine tools, which are characterized by the provision of a circular series of tool stations and a rotatable work carrier, which is adapted for periodic indexing movement, to carry work pieces to the successive tool stations.

This invention is particularly concerned with the combination and interrelation of parts of such a machine, it being among the general objects of the invention to provide such combination and interrelation of parts whereby the whole combines to provide a simple, efficient, rapid, flexible and automatic machine, which will faithfully perform a plurality of operations with dependability and accuracy.

Many of the elements of the machine form the subject matter of independent copending applications, which are directed to such elements per se, regardless of the structural details of the machine with which they are associated, and this invention is in part concerned with the combination and interrelation of such elements when combined in the type of machine herein set forth.

Attention is, therefore, directed to the following copending applications which relate to certain elements or sub-combinations of the structure to be claimed in the present case:

| Serial No. | Applicant | Filed | Title |
|---|---|---|---|
| 727,440 | E. C. Bullard | May 25, 1934 | Feed works |
| 729,366 | E. C. Bullard | June 7, 1934 | Bi-motor feed works |
| 9,094 | E. P. Bullard and E. H. Johnson | Mar. 2, 1935 | Machine tool spindle mechanism |
| 36,459 | E. P. Bullard | Aug. 16, 1935 | Lock pin assemblies |
| 39,234 | E. P. Bullard and E. H. Johnson | Sept. 5, 1935 | Carrier mechanisms |
| 51,735 | E. P. Bullard | Nov. 27, 1935 | Binding devices |
| 65,408 | G. R. Appelberg | Feb. 24, 1936 | Stroke control adjustment for machine tools |
| 65,409 | G. R. Appelberg | Feb. 24, 1936 | Double index mechanism |
| 98,472 | E. P. Bullard, III | Aug. 29, 1936 | Machine controller |

Other applications, covering specific structural elements, are about to be filed.

Generally speaking, it is a dominant object of the invention to provide a new, efficient and improved station type machine tool which will meet the ever increasing demands of industry for speed, accuracy, durability and economy of manufacture and operation.

Another important object of the invention is to provide a multiple operation machine which lends itself to a wide variety of effective and efficient employment. The term "flexibility" has been applied to this important, advantageous characteristic of the machine as indicative of its ease of change-over from one type of work to another, and its general applicability to widely varying demands of production, both as to cycles of operation and work to be performed.

A further aim of the inventors, carried out in the machine of the present invention, was to provide for ease and multiplicity of adjustment throughout the entire device. Such various adjustments have the triple advantage of, first, contributing to the establishment, maintenance and variability of coordination between cooperating elements and functions; second, providing for a facility of adjustment to compensate for wear, disalignment and abuse to which the machine may be subjected; and, third, to increase the ease, economy, accuracy and uniformity of manufacture not only of the machine itself but also articles produced or operated upon by the machine.

Another important object of the invention is to provide high speed operation by avoiding the necessity of a main clutch and avoiding the necessity of stopping and starting the spindle drive shafts during the indexing operation; machines of the type referred to having previously required that, during the indexing cycle, many of the instrumentalities of the machine, including the spindle drive shafts, were stopped and, at the expiration of the indexing movement, inauguration of the operation of such instrumentalities is required thus losing the kinetic energy which would flow from a continuous operation thereof. In the present machine, full mechanical efficiency is utilized to obtain economy of power as well as of speed and smoothness of operation.

As indicated by the enumeration of the copending applications, it is also an important object of the invention to provide for a combination and cooperation of certain of the various inventions set forth therein. Therefore, it is an object to unite, in one unitary, compact structure, a plurality of cooperating instrumentalities such that the machine, as an entirety, will express the virtues of the individual components.

It is further an object to provide, in such a machine tool, the combination of synchronous spindle drive and spindle braking and locking mechanism with improved indexing means and chuck operating means, and further in combination with improved carrier locking mechanisms, tool slides, feed works and timing mechanisms.

Another important object is to provide, in combination with such features, an improved, and readily changeable, double indexing mechanism whereby the machine may be operated to move each spindle from one work station to the next adjacent work station, or to another work station, once removed from the adjacent station, so as to provide for simultaneously carrying out two different series of operations as referred to in the prior patent to Edward P. Bullard, Jr., No. 1,455,282.

Other objects of the invention are further to provide, in such a machine, an improved and synchronous control system for controlling and co-ordinating the operations of associated instrumentalities.

Another object is to provide a machine, of the character set forth, which will be simple in construction and substantially automatic in operation, the present machine having been designed to avoid numerous parts heretofore required in the manufacture of, such as the machine illustrated in the patent to Edward P. Bullard, Jr., No. 1,360,175, and machines intended for the same general purposes.

Numerous other objects and features of the invention will be apparent from a consideration of the specification taken in conjunction with the accompanying drawings in which:

Figure 9 is a vertical side elevation, partly in section, and partly broken away, of the feed works shown in Figure 8.

Figure 10 is an enlarged detail, in side elevation, of certain timing mechanism appearing in Figure 2.

Figure 11 is a detail of a portion of the mechanism of Figure 10 and is taken from an angle of 90 degrees with respect to the view of Figure 10.

General characteristics

The machine shown in the accompanying drawings, and described in the following specification, is a vertical station type lathe machine tool, which is characterized by having screw feed tool heads, synchronized drive for the work spindles, braking and positive lock for the spindle at the loading station, improved indexing and carrier locking mechanism, means for conveniently changing the indexing cycle to provide for double indexing, a novel cycle control mechanism and improved feed works for the tools.

The machine is further characterized by the provision of two driving motors, one a main motor, which drives the spindles and the indexing mechanisms, and which drives the tool heads during their feeding operation so as to provide synchronism of such feed with the spindle rotation, while the other motor is a high speed motor operable to quickly retract the tools at the end of their feeding movement and to advance the tools to the beginning of their feeding movement.

One of the important characteristics of the invention is the provision of individually controllable speeds for each spindle; and a feature of the invention is to provide such individual spindle drives without requiring a main clutch mechanism for the machine thus permitting free, high speed rotation of the spindle drive shaft continuously during the operation of the machine without the necessity of stopping and starting the shaft during each indexing operation.

Another characteristic of the machine is the provision of readily adjustable means in the feed works by which the same may be individually set to cooperatively control associated mechanisms.

Other characteristics include the association in the machine of individual adjustability of various members, safety mechanisms, automatic stops and cross feeds, cushioning clutch devices, dwell mechanisms and speed change mechanisms.

Further advantages, features, objects and characteristics of the machine will become apparent from a consideration of the following specification of the machine here illustrated as particularly embodying the inventions hereinafter set forth in the claims.

Appearance

Figure 1:
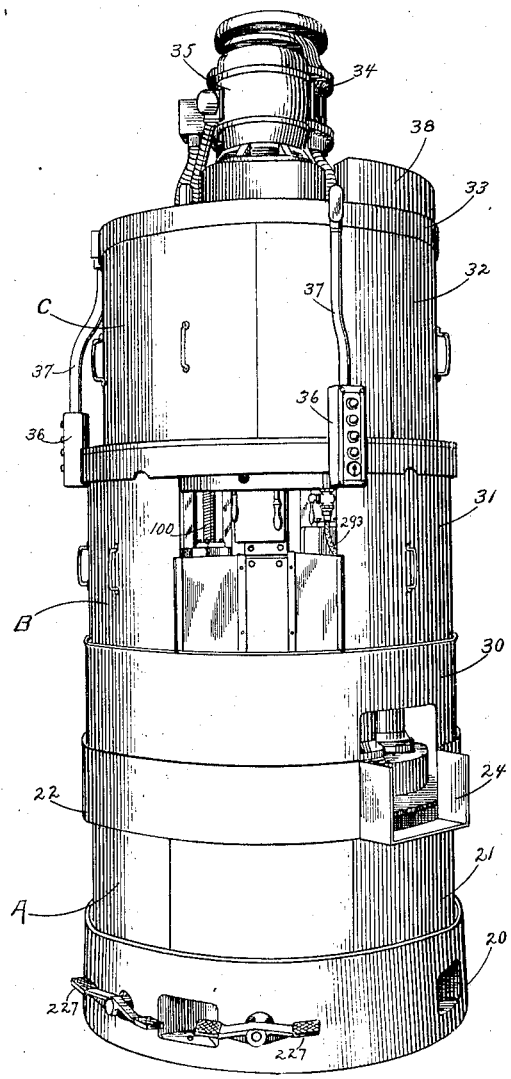
Figure 1 is a front elevation of one practical embodiment of the invention.

From an observation of Figure 1 of the drawings, it will be seen that the machine is designed to present an attractive and modern appearance, free from the characteristic protrusion of numerous levers, operating handles and adjusting devices common to prior multiple spindle lathes; and further free from dangerously exposed operating elements, the compact arrangement and the vertical disposition lending itself not only to a pleasing appearance, but also to economy of space.

The machine is characterized by a base section A, an intermediate working section B, and a superstructure C, on the top of which are mounted the driving motors. Each of the sections constitutes a compartment, which is enclosed by sliding panels that may be moved to provide access to any portion of the mechanism enclosed thereby. It will be noted that the working section B is provided with a normally opened section through which the operator may introduce and remove work pieces and observe the chucking operation of the machine. This compartment is also provided with a side opening through which the chips may be removed from the machine. This enclosing of the mechanism is designed not only to enhance the appearance of the machine, but to add a greater safety factor, and functions to reduce noise and unpleasant odors. Such construction also lends itself to the application of an exhaust system for the compartment B, by which smoke and fumes from the cutting operations may be withdrawn through a suitable exhaust system without contaminating the atmosphere of the surrounding shop.

Assembly

Figure 2:
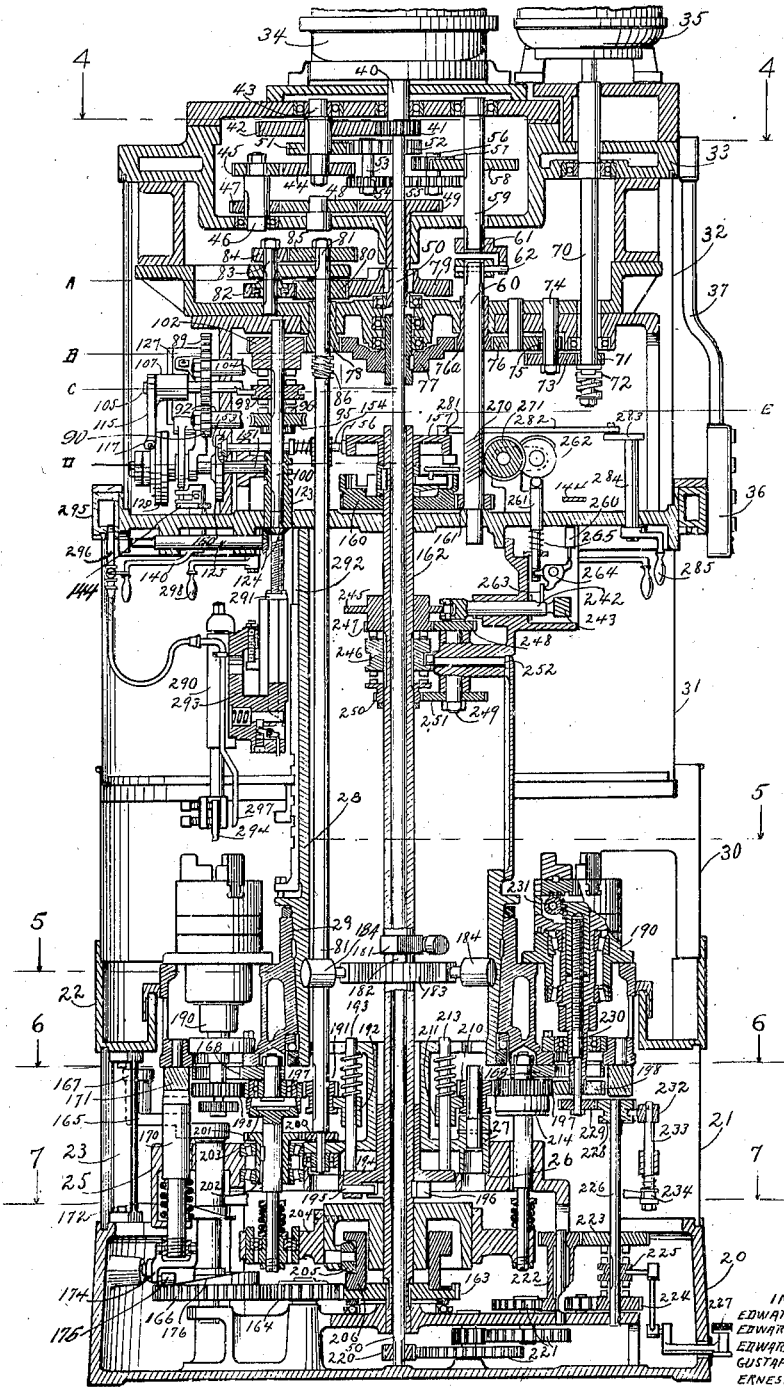
Figure 2 is a vertical section through the machine taken on the angular line 2—2 of Figure 3.

As is more clearly apparent from Figures 1 and 2, the structure includes a base 20, which forms the compartment A, and which houses the spindle drive mechanism, the indexing mechanism, lock pin assemblies, chuck operating devices and the like; the compartment being normally closed by sliding side panels 21, which extend from the base to an upper annular member 22 supported from the base by standards 23, the flange of the member 22 being cut away and formed with a chip disposal chute 24 to allow for the disposal of chips formed during the machining operations.

A central cage structure rises from the floor of the base 20 and is preferably cast integral therewith. The cage is generally indicated by the numeral 25 and provides bearings for the various instrumentalities within the base, and provides a seat 26 for a lower extremity 27 of a central vertical column 28. The column 28 provides a bearing surface for a spindle carrier 29 in which a plurality of spindles are mounted.

Tool slides to be later described are operated upon ways formed on the column by feed works mounted on the lower platform of the superstructure. For the purposes of safety, appearance, preventing the splattering of the cooling liquid and for the prevention of injury, due to flying chips, a guard ring 30 is mounted on the member 22 and, between it and the superstructure, sliding enclosure panels 31 are mounted, which normally enclose the tools and spindles.

In that embodiment of the machine illustrated in the drawings, eight spindles are provided in the carrier and the column is shown as octagonal in cross-section, thus to provide one loading and unloading station and seven working stations, each working station having its own tool head and feed works therefor. Obviously the number of spindles and stations may be varied to suit the particular requirements of the machine. The invention is not limited to the number of spindles nor the number of stations and, in some instances, the tool heads may equal in number the work spindles.

The superstructure itself is mounted upon the top of the column 28 and is enclosed by similar panels 32; on a top platform 33 of the superstructure is mounted a main motor 34 and a high speed traverse motor 35. Motor control switches, of which there may be several arranged around the machine, are indicated at 36, their cables being enclosed within a suitable conduit 37.

Cooperating control mechanisms such as relays and the like are mounted on the top of the superstructure as within casings 38. It is, of course, understood that the invention is not limited to a specific embodiment of the structural features here enumerated. The enclosing panels may, of course, be eliminated, the chip discharge trough may be changed and the arrangement of the control switches may be varied.

In fact, the structural details here illustrated and described are by way of illustrating a practical embodiment of the invention which is in nowise limited to the details herein set forth.

*Main drive*

The main driving motor 34 is preferably mounted centrally on the top platform 33 of the superstructure, its driving shaft 40 being directly connected with the machine through a gear 41, which meshes with gear 42, mounted on stud 43 to which is keyed gear 44 meshing with gear 45; the latter being keyed to stud 46. Since the gears 44 and 45 are mounted on the extremities of their studs, the arrangement provides for the ready removal of these gears and the substitution of gears of a different ratio so as to vary the speed imparted to the stud 46. Thus, from the main drive, we provide a speed selection by the provision of these gears, 44 and 45, which may be referred to as pick-off gears, and which may be changed in order to vary the primary drive of the machine from the main motor. The stud 46 has mounted thereon a lower gear 47 meshing with an idler gear 48 which, in turn, delivers rotation to a central main driving gear 49 upon the sleeve of which is secured a central bull-gear 79 from which the drive for the feed works is taken. The driving shaft 40 is also directly connected with and drives a central shaft 50, which extends vertically through the entire machine; suitable gearing at its lower end, as will be hereinafter described, being provided for the drive of subsidiary apparatuses, such as pumps and chuck operators. It is to be noted that, during the operation of the machine and throughout the entire cycle thereof, the main motor is in operation. Such an arrangement provides an increase in efficiency and speed since it is not necessary, during the operation of the device, to disconnect or stop such drive, thus causing loss of time and efficiency in reestablishing the drive and bringing it up to the desired speed.

*Indexing drive*

The indexing drive also derives its energy from the main motor 34; the stud 43, driven thereby, having mounted thereon an intermediate gear 51 meshing with a gear 52 mounted upon a stud 53. Upon the lower end of the stud 53 is a gear 54 meshing with a gear 55 on the lower end of a stud 56, the upper end of which carries a gear 57 meshing with a gear 58 on the upper portion of a primary indexing drive shaft 59.

Since the gears 54 and 55 are, like gears 44 and 45, mounted upon the ends of their respective studs, these gears are also adapted to be removed and replaced by other gear sets providing a different ratio of speeds between the studs 53 and 56. Thus these gears may also be referred to as pick-off gears and variation in the index drive speed may be provided for by changing such gears. This arrangement, therefore, provides an independent, variable speed drive for the primary indexing drive shaft 59. Thus either the main drive gear 49, or the primary indexing drive shaft, may have their speeds varied, with respect to the main motor, or with respect to each other, by changing the ratio of both sets of gears. It will be apparent that the speed of the machine, including the speed of the main drive gear and the primary indexing drive shaft, may be varied with respect to the speed of the main motor 34 independently of each other but when adjusted they will rotate in a selected speed relation.

The primary indexing drive shaft 59 is adapted to drive a secondary aligned indexing drive shaft 60 through means of a coupling 61 carried by the primary indexing drive shaft 59 which coupling is recessed to receive a pin 62 carried upon the upper extremity of the secondary indexing drive shaft 60. The pin 62 is of such strength and material as to be ruptured by an excessive load applied to the drive between the primary and secondary indexing drive shafts 59 and 60. Thus there is included, in the indexing drive, a safety element such as to preclude a damaging of parts should any unwarranted opposition to the indexing movement of the carrier be applied.

Adjacent the lower end of the shaft 60 is a timer control drive mechanism, which will hereinafter referred to, and on the lower end of the secondary indexing drive shaft is a gear which meshes with, and continuously drives, an element of an indexing control clutch, the structure and operation thereof being hereinafter referred to under the heading "Index control".

Traverse drive

A high speed reversible drive is provided for each of the feed works from the traverse motor 35; a shaft 70 of which has loosely mounted thereon a gear 71 adapted to be releasably driven by the shaft through the engagement of a spring-urged clutch element 72, which is rotatable with the shaft 70, thus providing a safety device which permits rotation of the shaft 70, independent of the gear 71, should excessive torque be applied.

The gear 71 continuously meshes with a companion gear 73 mounted on a stud 74; these gears forming a pair of removable gears which may be interchanged with other gears so as to provide variability in the drive from the traverse motor 35. The stud 74 also carries a gear 75, meshing with an idler gear 76, which, in turn, meshes with idler gear 76A loosely mounted on the secondary indexing drive shaft 60. The gear 76A, in turn, meshes with a central bull-gear 77, also loosely mounted, but meshing with a plurality of loose gears 78, one for each feed works. Thus it will be seen that the traverse motor provides a reversible high speed drive for each feed works. The drive includes change speeds by means of the gears 71 and 73, which constitute pick-off gears, and also includes the above described safety device which will preclude stripping of gears or damage to the motor as a result of excessive torque.

Feed works

For each tool station of the machine, there is provided an individual feed works for operating the tool heads in such a way that the spindles are individually driven in synchronism with the drive of the tools at their respective stations during the cutting operations. For a consideration of the detailed structure of the feed works, reference may be had to Figures 8 and 9, and to the copending applications, Serial No. 727,440, filed May 25, 1934, and Serial No. 729,366, filed June 7, 1934, hereinbefore referred to. Each feed works is adapted for selective drive, either from the main motor 34 or the traverse motor 35. The main motor drive, which is used in the cutting operation of the tool head and for driving the spindles, is taken from the bull-gear 79 through individual idler gears 80 mounted upon spindle drive shafts 81, while the reversible traverse drive is taken through similarly mounted idler gears 78. The main motor drive, through gear 80, drives a companion gear 82 mounted on stud 83 to frictionally drive the stud therewith, the frictional relationship providing a safety factor for the drive from the main motor. Upon the upper end of the stud 83, a gear 84 meshes with a companion gear 85 keyed to the individual spindle drive shafts 81. The gears 84 and 85 are companion pick-off gears, which may be readily removed and substituted by gears of a different ratio so that the machine provides for individual speeds from the main motor for each feed works and spindle drive shaft. The variation in such speed, effected by a change in the ratio of gears 84 and 85, will be seen to synchronously affect the drive, at that station, of both the spindle drive shaft and the feed works. However, such variation will not affect either the companion feed works or drive shafts, i. e., those for the other stations; nor will it affect the feed works drive as delivered from the traverse motor 35.

The drive for the feed works proper is taken from the spindle drive shaft 81 by a worm 86 mounted thereon, which engages a worm wheel 87, mounted upon a shaft 88, upon the forward end of which is mounted a gear 89 meshing with a companion gear 90; the gears 89 and 90 being pick-off gears which may be readily removed and substituted by gears of different ratios so as to effect a change in the speed of the feed works drive from the main motor. It will be noted that this means for varying the speed is not only individual to each feed works, but does not affect the speed of the spindle drive shaft 81. Thus, by changing the gears 89 and 90, the speed of the feed works, with respect to the speed of the spindle, may be varied without disturbing the synchronism between both drives.

The gear 90 is mounted upon the forward end of a shaft 92, parallel to the shaft 88, which has formed thereon a worm 93, which drives a worm gear 95, and which constitutes the feed gear for the tool feeding drive of the feed works. The gear 95 is loosely mounted upon feed screw 100 and feeding drive is established for the feed screw 100 by clutching of the gear 95 thereto. The upper face of the gear 95 is provided with clutch teeth 96, engageable by a clutch element 98, the lower teeth of which cooperate with teeth 96 when the tool head is to be driven from the main motor. The clutch element 98 is splined to the feed screw 100 so as to impart rotation thereto when the clutch is engaged.

Reversible traverse drive from the motor 35 is provided for by a gear 102, which is driven from the idler gear 78, loosely mounted on the spindle drive shaft 81; the lower face of the gear 102 having clutch teeth 104, similar to teeth 96, and engageable by the clutch element 98 to establish drive of the feed screw 100 from the gear 102.

Feed works control structure

Figure 8:
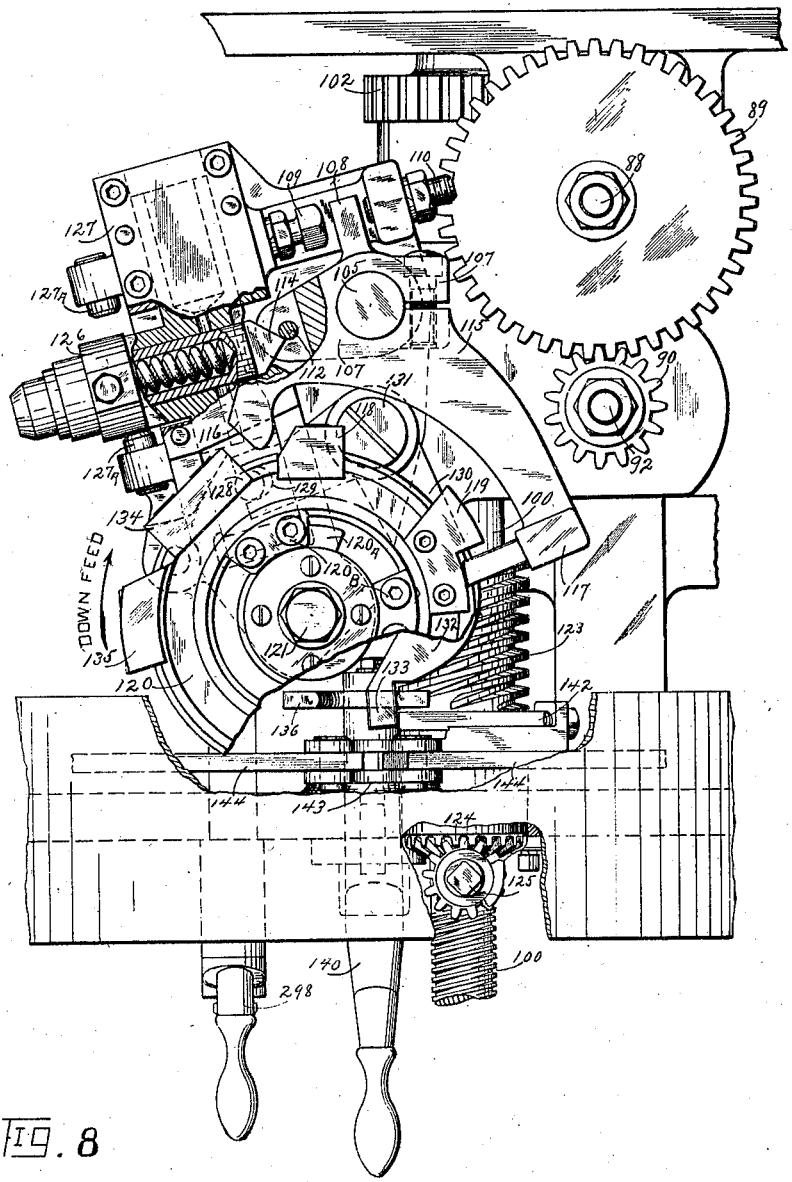
Figure 8 is an enlarged detail, in end elevation, of one of the feed works of the machine.

The mechanism for the control of the feed works clutch 98 is illustrated in structural detail by Figures 8 and 9. Features of this construction are claimed per se in the copending application, Serial No. 727,440, filed May 25, 1934.

This structure includes a clutch throwing shaft 105, the inner end of which is provided with a clutch engaging fork 106. The shaft 105 extends transversely of the feed works parallel to the shafts 88 and 92 and has adjacent its forward end a lug 107 having a stop protrusion 108 extending between adjustable stop screws 109 and 110, which limit the extent of the rotary movement of the shaft 105 and thus the extent of movement of the clutch element 98. The lug 107 is also provided with a pin 112, which is adapted to be engaged by a spring-urged arrowhead 114, which is adapted, by engagement with the pin 112, to urge the shaft 105 to its extreme position in one direction, or the other, after actuation thereof by the actuating mechanism.

The forward end of the shaft 105 is further provided with an actuating arm 115 having ends 116 and 117 which are alternately engageable by cams 118 and 119, respectively, which cams are mounted upon a cam wheel, or disk, 120. The cam wheel, or disk, 120 is mounted for a lost motion driving connection upon a shaft 121. A worm wheel 122 on the inner end is driven by and with a worm sleeve 123 rotatable with the feed screw 100. Means for manually setting the feed screw, and shaft 121, are provided through the sleeve 123, the lower end of which is connected by bevel gears 124 with a manually rotatable adjusting shaft 125 to which a wrench may be applied to independently adjust the mechanisms in the original tooling operation. Lost motion drive for the disk 120 is provided for by mounting the disk loosely on its shaft 121 and providing the shaft with a finger 120A mounted between adjustable lugs 120B on the face of the disk 120. Thus, with the parts shown, as in Figure 8, the shaft 121 may be rotated in clockwise direction, a limited amount, independent of the disk 120, or until the finger 120A strikes the right hand lug 120B. Similarly in reverse operation following a clockwise rotation such lost motion ensues.

The oscillating movements of the shaft 105 are controlled not only directly from the movement of the arm 115, by engagement with the cams 118 and 119, but are also controlled by reciprocation of a holder 126 for the arrowhead 114. The holder 126 is slidable within its bracket 127, its movement being limited by adjustable stop screws 127A. The slidable shank of the holder is provided with a pin 128 engageable by a forked extremity 129 of a bell-crank 130, which is pivoted, as at 131, and which terminates in an opposite downwardly extending arcuate end 132, which has a downwardly extending finger 133, which may be both manually and automatically operable to shift the arrowhead in its bracket. The pin 128 is also engageable by cams 134 and 135 mounted on the disk 120 in order to perform certain functions hereinafter discussed under the heading "Feed works control operation". The finger 133, and thus the arrowhead, may be moved manually by a forked arm 136 secured to a manually operated rod 138, which terminates in a hand lever 140; this control being individual for each of the feed works, or the arm may be shifted by a push-rod 142 mounted upon the upper end of a sleeve 143 concentric with the rod 138, which sleeve is operable automatically in timed sequence in the operation of the machine through links 144.

*Feed works control operation*

The parts, as illustrated in Figures 2, 3, 8 and 9 of the drawings, are in a neutral position and, for hand operation, the lever 140 may be moved to rock the bell-crank 130 in clockwise direction, thus the forked end 129 will raise the pin 128, and with it the arrowhead, which will pass by the pin 112, it being impossible to move the pin 112 upwardly with it, due to the engagement of the end 117 of the arm 115 with the flat stepped surface of the cam 119. After the arrowhead passes the pin 112, its lower slanted surface will exert a downward pressure on the pin 112, thus tending to rock the shaft 105 in counter-clockwise direction, (Fig. 8) in which direction it is free to move, whereupon the clutch actuating fork will move the clutch upwardly to engage the teeth 104 of the gear 102 and thus initiating a traverse movement of the head.

During this phase of the automatic cycle of operation, the reversible motor 35, driving the gear 102, will be operated in such a direction as to rotate the feed shaft, or screw 100, through the clutch 98 in such direction as to cause down direction of movement of the tool head. During the automatic cycle, the movement of the clutch 98 from neutral is effected, not by the hand lever 140, but through the push-rod 142 as will be more fully explained hereinafter; the same directions of movement and the same reactions of parts will take place. With the clutch 98 engaging the teeth 104, it will be seen that the shaft 121 is rotated from the feed screw in a clockwise direction (Fig. 8) in response to such down traverse movement. The initial movement of the shaft 121 in the direction of the arrow (Figure 8) will not cause any responsive movement of the cam wheel, or disk, 120 until such time as the finger 120A abuts the right hand lug 120B. The cam wheel, or disk, thus remains stationary during the first part of the down traverse movement of the head and, as will be hereinafter described, remains similarly stationary at the beginning of the subsequent up traverse movement.

Upon the engagement of the finger 120A with the right hand lug 120B, the cam wheel, or disk, 120 is picked up and moved with the shaft 121 in clockwise direction, such movement being very slight however. Upon such slight movement of the cam disk, the cam 134 thereof (i. e. the shoulder indicated by the broken line in Fig 8) engages the pin 128 moving it, and the arrowhead holder 126, downwardly. Due to the fact that the clutch is in its extreme upward position, no further movement of the shaft 105 is possible, thus the arrowhead again passes the pin, and on passing dead center urges the shaft 105 in clockwise direction which is, at this time, permissible, due to the fact that the extremity of the arm 115 has been relieved of retention by the cam 119 because of the counter-clockwise rotation of the cam wheel. Thus, shortly after the engagement of the finger 120A with the right hand plate 120B, the clutch will be shifted downward, disconnecting the rapid traverse drive to the feed screw and engaging the clutch with the clutch teeth 96 of the gear 95 which is driven through the gears 89 and 90 from the shaft 88. At this time the feed screw will be operated in the same direction as before but at a downward feeding speed in synchronism with the drive of the spindle, since both the spindle and the gear 95 are synchronously driven from the shaft 81.

During the feeding movement, the cam disk moves continuously with the shaft 121 by virtue of engagement of the finger 120A with the right hand lug 120B, the feeding movement being terminated individually for each head by the engagement of the cam 135 with the pin 128 which raises the arrowpoint past the pin 112, which thus rocks the shaft 105 to throw the clutch element 98 out of engagement with teeth 96 and into engagement with teeth 104 thereby changing the feed to up-traverse. During the feeding movement, associated synchronized mechanism, hereinafter described, provides for the reversal of the traverse drive motor 35 so that, upon such re-engagement of the teeth 104, the head is returned at traverse speed to the initial starting position. Upon such reversal of the feed screw, the shaft 121, which rotates therewith, is reversed and the lost motion between it, and the cam wheel, or disk, is picked up by engagement of the finger 120A with the left hand lug 120B until such time as the left hand side of the cam face of the cam 134 again engages the pin 128 to move the arrowpoint downwardly past the pin 114. As the arrowhead passes dead center the spring will urge the shaft 105 to move the clutch toward the feeding position; such movement, however, being prevented at this time by the engagement of the extremity 117 with the outer face of the cam 119 which, by this time, has been rotated to a position radially in line with extremity 117. The up traverse will therefore continue until the outer face of cam 119 is carried past the extremity 117 at which time the arrowhead spring will lock the parts into the position shown in Figure 8. Thus the feed works provides for an automatic cycle of operation; a down traverse, a down feed and return traverse and a return of the control parts to neutral, all being automatically controlled and individually adjustable as to extent for each head, due to the adjustment of the cams on the disk and the adjustability of the lost motion.

Index control

Figure 3:
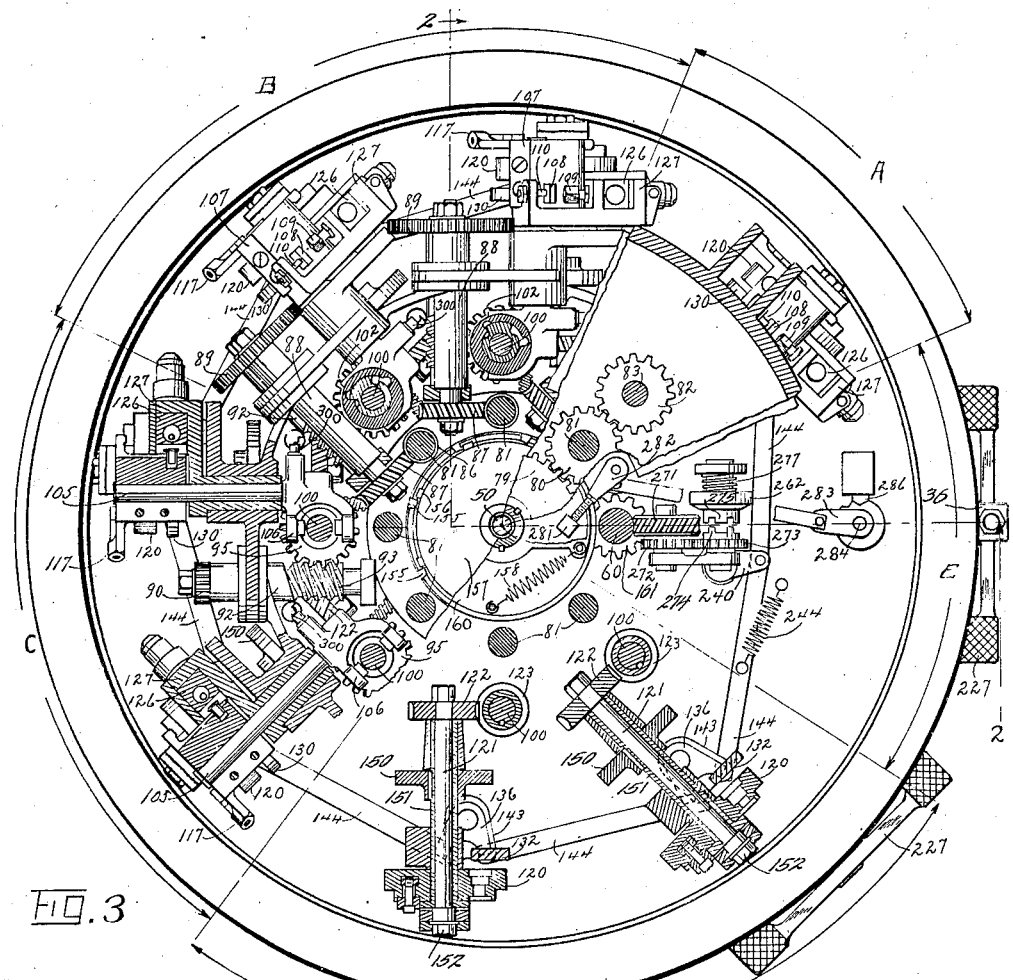
Figure 3 is an enlarged horizontal, sectional view through the superstructure of the machine, fragments thereof being taken on the levels A—B—C—D and E of Figure 2, as indicated by the segments A—B—C—D and E of Figure 3.
Figures 12, 13:
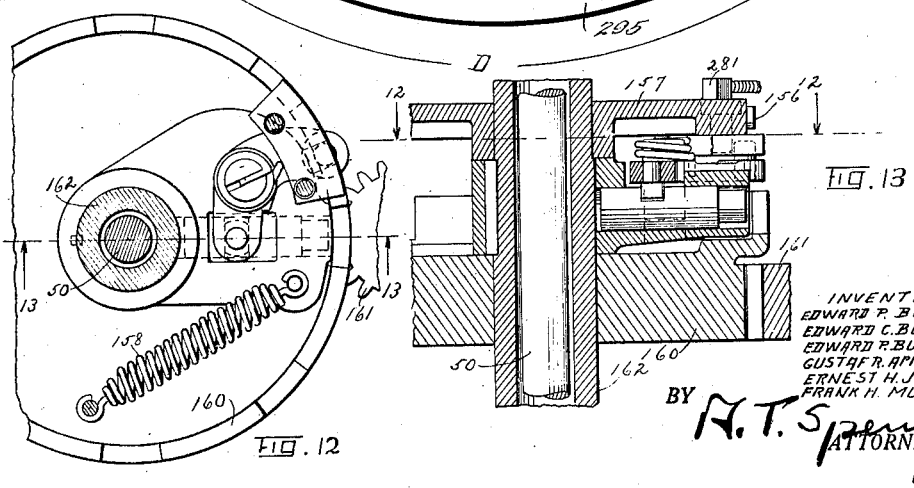
Figure 12 is a detail showing a top view of the indexing clutch mechanism.
Figure 13 is a section on the line 13—13 of Figure 12.
Figure 4:
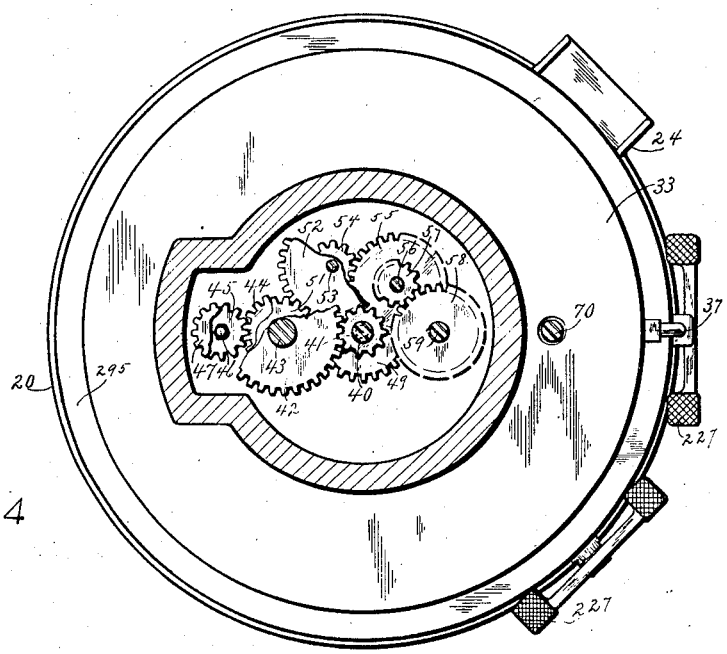
Figure 4 is a horizontal, sectional view taken on line 4—4 of Figure 2.

The synchronized control of the various feed works is provided for in connection with the control of the indexing mechanism, the several feed works having joint control by virtue of an index control plate 150 rotatable with each of the shafts 121 in the manner set forth in the copending application of Gustaf A. Appelberg, Serial No. 65,408, filed February 24, 1936. The plates 150 are mounted upon sleeves 151 which may be angularly adjusted, with respect to the shafts 121, by loosening nut 152 and turning the sleeve 151, with respect to the shaft 121, so that individual adjustment and positioning of these plates may be provided for. The shaft and sleeve are locked together in adjusted relation by the serrations or teeth, shown in Figure 9, on collars attached to the shaft and sleeve. Each plate is provided with a recess indicated at 153 in Figures 2 and 9, which is adapted to receive therein the head of a control rod 154, slidable in the frame of the feed works, the recess being adapted for registration with the head only at such times as when the tool head is in a fully raised position and the clutch in neutral position as hereinbefore described. Such an arrangement provides for the inward projection of each rod by the camming action of recess 153 as soon as movement of the feed screw takes place. The inner ends of the rods, as indicated at 155 in Figures 3, 9 and 13 are, when in the inward thrust position, adapted to interengage with lugs 156 on an upper element 157 of the index clutch which element is thus restrained from movement during any movements of the screw feed shafts. When, however, each of the heads have returned, after feeding operation, to their upward position, the rods 154 are moved by spring pressure outwardly and are received within the recesses 153, thus releasing the element 157, which is under normal pressure of a spring 158, and which is thus moved by the spring to cause a clutching action between the element 157 and its companion driving member 160. The structure is similar to the indexing clutch arrangement in Patent No. 1,360,175, a detailed section showing the clutch arrangement being indicated at Figure 13. The element 160 is continuously driven by the motor 34 through the shaft 60 and gear 161 and such clutching provides for a drive of an indexing sleeve 162 to which element 157 is keyed; the element 160 being loosely mounted thereon for continuous rotation by the shaft 60.

Index arm

On the lower end of the central index sleeve 162 is mounted a gear 163 which meshes with an idler gear 164 which, in turn, drives an indexing arm 165 through its gear 166. The indexing arm 165 terminates at its upper end in a crank 167 which is adapted to engage and pass between adjustable indexing plates 168 on the carrier 29, thus to move the carrier a predetermined distance upon each revolution of the indexing arm.

The cooperation of the indexing arm with the adjustable plates 168 of the carrier is more fully explained in specific detail in the copending application of E. P. Bullard and E. H. Johnson, Serial No. 39,234, filed September 5, 1935 for Carrier mechanism, to which reference may be had. The plates 168 are mounted on the lower face of the carrier and are apertured to permit the spindles to freely pass therethrough and may thus be freely adjusted with respect to the carrier without disturbing the spindle setting. These plates 168, which may also be noted in Figure 6, receive turning effort from the terminal end of the indexing crank 167 and, by their adjustment, the movement of the carrier, in response to each rotation of the arm, may be so as to provide for adjustment and compensation for wear, and to provide ease and accuracy of the original assembly, it being unnecessary to machine the carrier with such accuracy as to ensure accurate indexing thereof since accurate indexing is provided for by the positioning and location of the plates 168.

Lock pins

In order to assist in the accurate positioning of the carrier on the termination of the indexing operation, and further in order to securely lock the carrier in its indexed position, a reciprocating lock pin 170 (Figs. 2 and 6) is provided within the base which is adapted to successively engage lock pin lugs 171 adjustably secured to the carrier. The lock pins, and their associated lugs, are illustrated in detail in the copending application of E. P. Bullard, Serial No. 36,459, filed August 16, 1935 for Lock pin assemblies. The lock pin 170 has a furcated end and is set to permit a limited resiliency of the furcations thereof and, upon engagement with a lug, they receive a bit thereof between the furcations. The cooperating angles of the furcations and bit act to assist in positioning the carrier and to thereafter retain the same in its engaged position; the resiliency of the furcations acting to provide smooth operation and avoid jarring due to the locking action.

The lock pin 170 is normally urged upwardly by a spring 172 so as to maintain its engagement with the lug 171 during the machining operations. The lower end of the lock pin 170 is engaged by an arm 173 (see Figure 6) of a centrally pivoted lock pin operating bar, an opposite arm 174 of which, through a roller 175, rides upon a lock pin operating cam 176 mounted upon the gear 166; the contour of the cam being such that, just prior to the engagement of the indexing crang 167 with one of the carrier plates 168, the arm 174 of the bar will be raised, thus lowering its opposite arm 173 and retracting the lock pin 170 against the pressure of its spring 172; the contour of the cam further providing for the lowering of the arm 174 just as the indexing movement is being completed so that the pin 170 will, through its spring pressure, be urged upwardly to engage the next successive lock pin lug 171.

An important feature of this phase of the invention is more fully set forth in the copending application of E. P. Bullard, Serial No. 36,459, filed August 16, 1935, for Lock pin assemblies which relates to the individual adjustability of the lugs 171, with respect to the carrier, so that they may be individually shifted, so as to compensate for wear and to eliminate the necessity of perfect accuracy in the machining of the carrier. In order to compensate for variations due to wear, the lugs may be adjusted sideways, such adjustment may be in conformity with the forementioned adjustment of the indexing plates 168. However, each individual plate and each individual lug may be separately adjusted, and thus the invention provides for an adjustment between indexing movement and locking position to the end that, in originally assembling the machine, and in subsequent adjustment of the machine, a wide flexibility of adjustment, without the necessity of rebuilding and reboring, may be secured.

It will be seen that, by this arrangement, a synchronized action of the locking mechanism with the indexing mechanism is provided for, and such synchronism is adjustable in that both the movement given to the carrier and the position at which the carrier is locked may be individually adjusted, with respect to stations, and individually adjusted, with respect to each other.

Carrier binder

Figure 5:
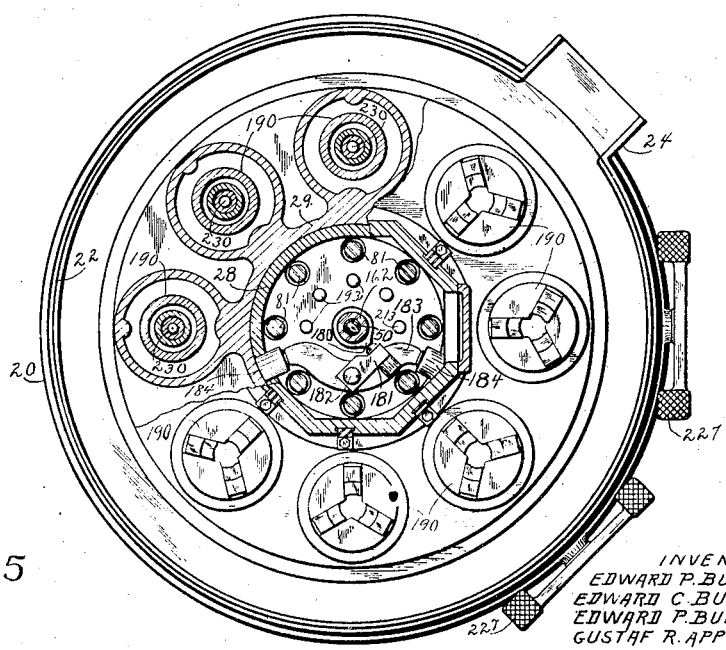
Figure 5 is a horizontal, sectional view taken on line 5—5 of Figure 2.

Associated with the indexing drive sleeve 162 is a binder mechanism operable in timed cycle with the indexing to assist in locking the carrier, with respect to the column, so as to ensure a positive, vibrationless position of the carrier. This mechanism includes a cam 180 (see Figure 5) secured on the sleeve 162 for rotation therewith; its cam peak being arranged at the end of the index cycle to move outwardly a pivoted actuating arm 181, which is secured to an actuating stud 182, the lower end of which is formed in a crank, or eccentric, journalled within a yoke 183; the ends of which bear against binding pins 184, which extend through the walls of the column 28; the arrangement being such that, at the end of the index movement, the arm is rocked and the yoke moved outwardly to exert outward pressure upon the binding pins 184 which are in engagement with the inner face of the carrier. This arrangement not only insures binding of the carrier and release thereof at the appropriate time during the indexing cycle, but provides for a binding having equally distributed pressures; the binding forces being distributed between the two spaced binding pins 184 and the opposite intermediate area of the column wall. A detailed illustration of this particular portion of the device is set forth in the copending application of E. P. Bullard, Serial No. 51,735, filed November 27, 1935.

Spindle drives

The spindles 190 are adjustably mounted through apertures in the carrier 29 (see Patent No. 1,970,276 and application of E. P. Bullard et al., Serial No. 39,234, filed September 5, 1935) and are successively driven at the successive work stations by spindle driving shafts 81 which, as aforesaid, are driven from the feed works and in synchronism with the feeding drive. Splined for rotation with and for longitudinal movement on each shaft 81 is a gear 191 which may be reciprocated to a position out of engagement with the driven gear by forks 192 fixed to reciprocating rods 193 which rest upon a plate 194, which plate is adapted for reciprocating motion by engagement of a pin, or roller, 195 thereof with a cam 196 mounted upon the indexing sleeve 162. This arrangement is such that, prior to the movement of the carrier to its new position, the plate is raised by the cam to move upwardly the gears 191 so that there will be no obstruction to the movement of the carrier to its new position and so as to avoid any clashing of the gears 191 with the gears 197 which are mounted on the carrier for indexing movement therewith and mesh with the spindle gears 198.

The lower ends of the shafts 81 also carry, fixed thereto, gears 200 which are in constant mesh with companion gears 201 mounted on splined sleeves 202 through which are reciprocated cone clutch devices 203. These devices are also actuated in timed sequence with the indexing movement by engagement, at their lower ends, in a plate 204 which is periodically reciprocated by the engagement of a roller 205 thereof in a cam 206, which is mounted on the gear 163 which rotates with the indexing sleeve. The sleeves 202, cone devices 203, plate 204 etc., are carried by the cage 25 and do not rotate with the carrier 29. Accordingly, it will be understood that the clutch devices 203 cooperate with the different gears 197, successively, as the carrier is indexed.

The cam path of the cam 206 is such that the plate 204, and with it the devices 203, are raised prior to the lowering of the gears 191. As these devices are raised, cones 203 of the clutch devices engage within companion clutch surfaces on the gears 197, this engagement being established after the carrier is moved and locked into its new position. Such engagement provides for a frictional drive, or braking, of the gears 197, which synchronizes the speeds of the gears 197 with those of gears 191. A further movement of the indexing sleeve drops the gears 191 into mesh with the gears 197 and drops the cone clutch devices 203 so that positive drive of the gears 197 from the shafts 81 is established but only after primary frictional drives which provide for bringing the gears 197 to the same speed as that of gears 191 before they are meshed.

Spindle braking and locking

As also illustrated in the copending application above-mentioned, means are provided at the loading station, at which there is no drive shaft 81, for retarding and braking the spindles and for securing the same in a stationary position. This means includes a gear 210, (Figure 2) which is a counterpart of gear 191, and which may be raised, or lowered, by a fork 211 fixed upon a stud 213, these parts being counter-parts of the parts 191, 192 and 193. A friction brake assembly 214, similar to clutch device 203, slidable through the frame structure in response to movements of the plate 204, is provided, but, in this instance, it is keyed against rotation in the frame structure. Thus, when the gears 197 reach the loading station, the brake 214 first acts to retard the spindle and subsequently the gear 210 drops to secure the gear 197 and, with it, the spindle against rotation.

Chuck operator

Figure 6:
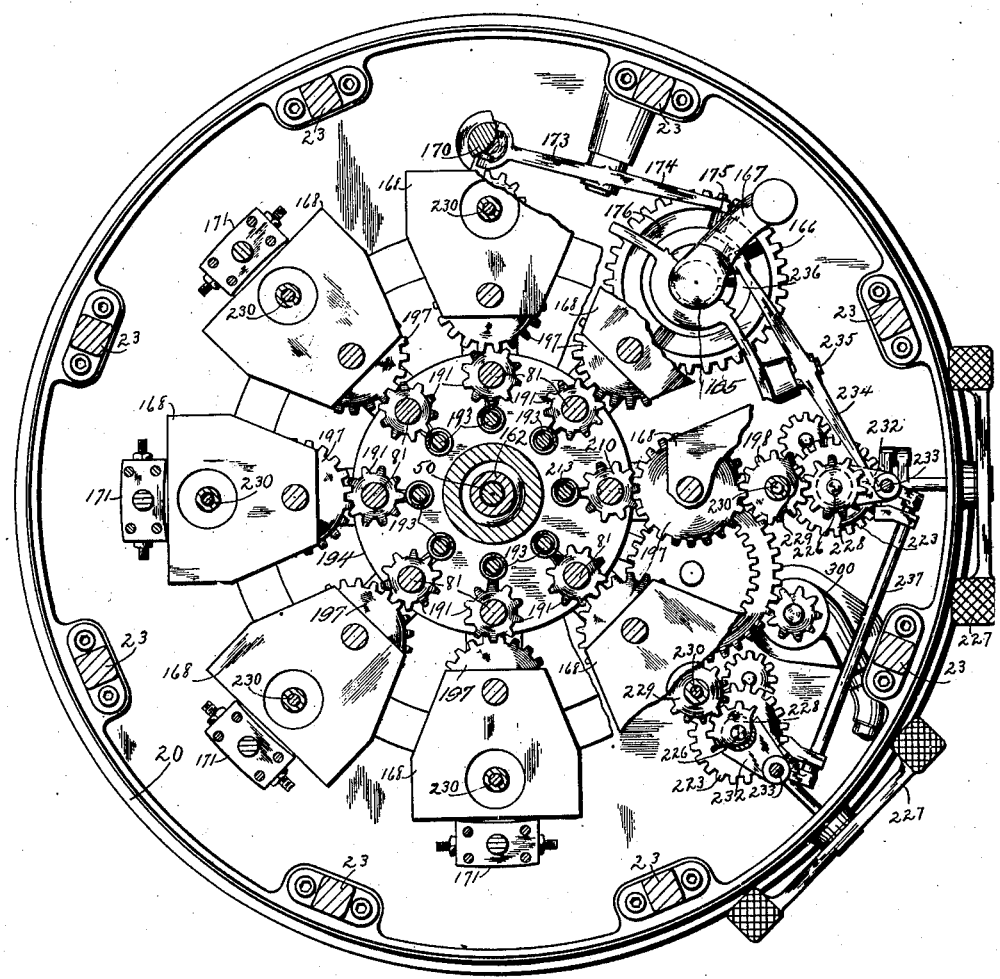
Figure 6 is an enlarged horizontal, sectional view taken on line 6—6 of Figure 2.
Figure 7:
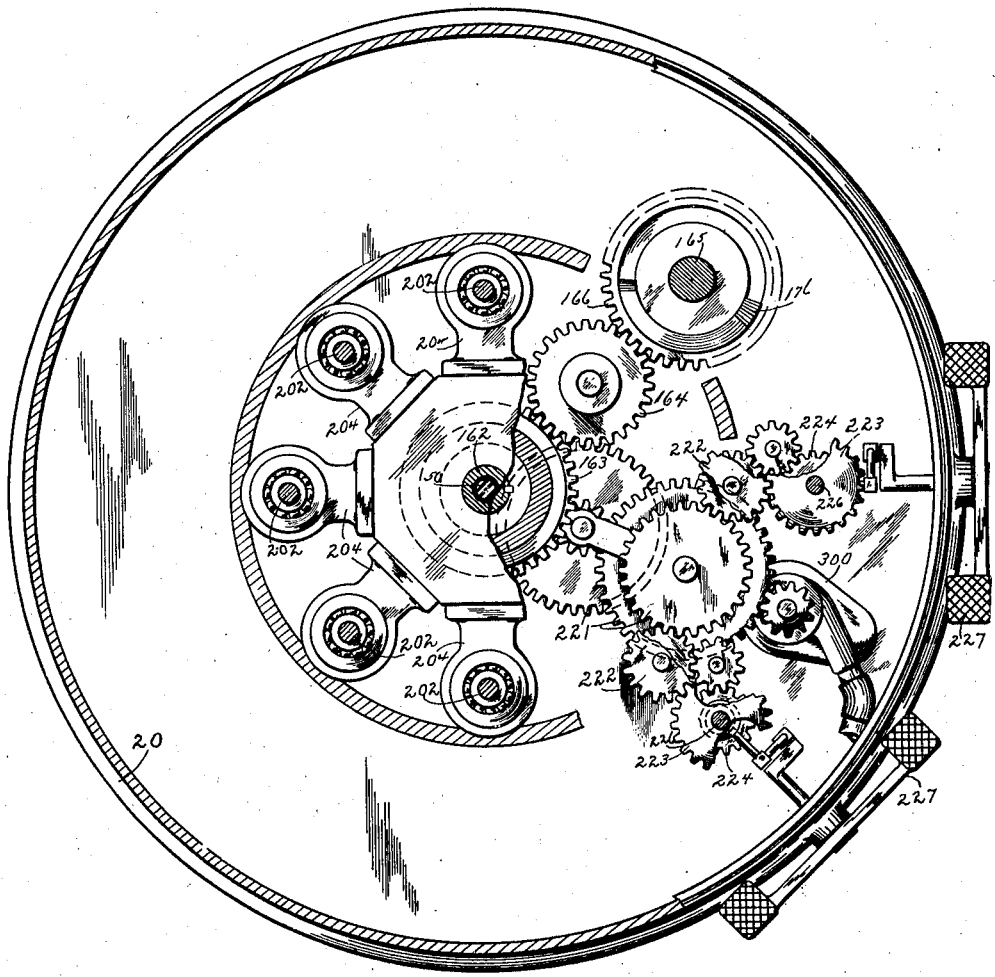
Figure 7 is an enlarged horizontal, sectional view taken on line 7—7 of Figure 2.

Each spindle is provided with a suitable chuck, or fixture. For operating the jaws thereof when they are at the loading station, which, by the way, may be occupied by two spindles in the case of double indexing, a chuck operating drive is provided from the main central shaft 50 by a gear 220 at the lower end thereof which, through gears 221, continuously drives a double geared sleeve 222 which, in turn, drives in opposite directions an upper gear 223 and a lower gear 224, both of which are provided with clutch teeth which may be alternately engaged by a sliding clutch 225 keyed to a chuck operating shaft 226. The movement of the clutch is under the control of foot elements 227 which, by movement in one direction or the other, establish drive for the shaft 226 selectively from one of the gears 223 or 224. As shown in Figure 2, such drive will be delivered by a gear 228 to a gear 229 secured to a rotatable chuck operating rod 230 mounted within each spindle, rotation of the rod being adapted to rock chuck operating gear segments 231 and thus to move the chuck jaws in a conventional manner. For precluding premature engagement between the gears 228 and 229, the gear 228 is slidably mounted on shaft 226 and moves upward into engagement with the gear 229 in sequence with the indexing movement, such upward movement being provided by a fork 232 mounted upon a rod 233 operated by an arm 234 which is centrally mounted on a part of the frame, as at 235; its opposite end being engaged by a cam 236 associated with the indexing arm 165. This cam 236 is so formed that the gear 228 will be held out of engagement with the gear 229 whenever the carrier 29 is undergoing an indexing movement. In the case of two chuck operators, as shown in Figure 6, the second gear 228 is actuated by a cross-link 237.

Tool heads

It will, of course, be understood that work mounted on the work spindles is to be operated upon by tools carried in reciprocating tool holders, or slides, generally indicated at 290 (Fig. 2). Since a wide variety of tool heads may be successfully employed on a machine of the type disclosed herein, it is thought sufficient to refer to the copending applications of F. H. Mussler, Serial No. 51,726, filed November 27, 1935 and E. P. Bullard, III, Serial No. 59,731, filed January 18, 1936, which disclose tool heads particularly adaptable to the present type machine. Such heads are as shown in Figure 2 and include an internally threaded member 291, the threads of which embrace the threads of the feed screws 100. The members 291 being secured against rotation, it is obvious that such members will move vertically with respect to the column 28 upon rotation of the screws 100. Operatively connected to the member 291 is a tool slide, or saddle, 293 which may move in ways 292 formed on the column 28. Compound movements of a tool 294 may be provided for by such mechanisms as shown in the applications referred to. Obviously the invention is not limited to the specific type of tool head used.

Cutting compound system

The present invention includes a built in system for the direction and efficient delivery of cutting compound in the form of a coolant, or a lubricant. This system includes an annular chamber 295 (see Figure 2) formed on the periphery of the superstructure to which a compound may be pumped by either a pump (not shown), driven by the main motor, or by a separate pump. The chamber 295 is tapped to deliver therefrom fluid through individual pipes 296 which are connected by flexible tubing to the heads 293, their delivery ends 297 being arranged appropriately to the tools 294. Thus, as the heads move the coolant, or lubricant, discharge end moves therewith to effectively deliver the fluid in the most efficient manner.

Manual adjustments

For manually moving the clutches of the feed works, in addition to manual setting of the screw 100 through gear 124 and in addition to manual initiation of the feed works cycle, individual arms 298 (Figs. 2 and 9) are provided which oscillate vertical rods 299, the upper ends of which engage, in a cam slot thereof, fingers 300 (see Figure 3) connected with the clutch operating fork 106 so that upon oscillation the arms 298 may move the clutches independent of their automatic operating elements.

Hand means may be provided for precluding inadvertent indexing of the machine during adjustment or tooling operations, which means include a stop 281 (Figs. 2 and 3) on the end of the index clutch element 157, which stop may be abutted by a link 282 controlled by an arm 283 on a shaft 284, the lower end of which terminates in a manually controlled handle 285. As shown in Figure 3, the shaft 284 may be secured in its adjusted position by a spring urged plunger 286. During the normal operation of the machine, the handle is moved to retract the plunger out of the engagement with the stop so that normal indexing operations may be performed.

Automatic cycle control

As hereinbefore stated, the individual feed works may be individually caused to go through their cycle of operations by manipulation of the individual hand levers 140. For automatically initiating the simultaneous operations of all the feed works, as in the usual continuous operation of the machine, the push rods 142 on the sleeves 143 are simultaneously actuated by links 144 which are joined through the sleeves 143 to form a complete circle actuated by an arm 240 (see Figures 3, 10 and 11). The arm 240 forms part of a synchronized cycle control mechanism and is mounted upon a vertical shaft 241 which is adapted to be oscillated by a push rod 242, slidably mounted in the fixed frame, the outward thrust of which will push an arm 243 fixed on the lower end of the shaft 241, thus to oscillate the same and move the arm 240 to thus move the links 144 against the tension of spring 244 and thereby simultaneously actuate all the feed works bell cranks 130 and thereby simultaneously initiate the working cycle of all the feed works.

Multiple indexing

For operating the push rod 242 to control the initial operation of the down traverse movement at the termination of the indexing cycle, a cam 245 (Fig. 2) is loosely mounted on the indexing sleeve 162, this cam being adapted to be driven through a clutch member 246 splined to the sleeve 162; the clutch member when in the upper position driving the cam directly from the sleeve, while in its downward position, the cam is driven through its gear 247 from a gear 248 meshing therewith and mounted upon a shaft 249, the lower end of which is driven by the sleeve 162 through gears 250 and 251 with the result that the clutch member is driven at one-half the speed of the sleeve 162. The clutch member is adapted to be manually shifted by a crank end of a shifting shaft 252 by the application of a wrench or key to the end of this shaft. The details of this construction and operation of this mechanism will be found in the copending application of G. R. Appelberg, Serial No. 65,409, filed February 24, 1936.

By this provision of selectable driving means for the cam 245, multiple indexing is provided for. With the clutch in its lower position, the gearing is arranged so that the drive to the cam 245 is at one-half the speed of the sleeve 162 so that a termination of the indexing movement and a reestablishment of the feed works operation is provided for only after two complete revolutions of the sleeve 162 and consequently two indexing movements of the carrier. This arrangement also provides for an adjustment in the angular position of the cam 245, with respect to the sleeve 162, so that, during the double indexing operation, the high spot in the cam, which actuates the feed works, can be altered to compensate for a variation in the setting of the parts, it taking somewhat more time to lock the carrier and carry out other associated indexing operations, after the double index, than is required for a single index. Thus, just prior to the end of the indexing movement, whether it be single or double, the rod 242 is moved outwardly and the linkage system is moved against the pressure of the spring 244 to inaugurate the down traverse of all the tool heads through releasing all of the feed works clutches by the movement of the push rods 142.

For controlling the circuit to the reversible motor 35 so that, at the end of the down traverse movement of all the heads, it will be reversed and ready to traverse the heads upwardly at the end of the feeding movement and to permit time lapse between energization of the motor so as to avoid shocks, power losses and motor heating effects, due to instantaneous reversals, a switch, indicated at 260 (Fig. 2), is provided, which switch is under the double control of the rod 242 acted upon by the cam 245 and by a push rod 261 acted upon by a cam 262. A pin 263 on the rod 242 bears against one arm of a switch operating crank 264, while another arm of the latter is received within the rod 261. This arrangement is such that, as the indexing sleeve 162 rotates, the rod is gradually moved outwardly to move the switch to a neutral position to cut power to the motor 35; such movement, however, not affecting the feed works control shaft 241. At the end of the indexing movement, or preferably slightly before that, approximately forty degrees of the rotation of the sleeve 162, the switch is moved by the rod 242 to a full contacting position so as to establish drive for the motor 35 in such direction as to cause down traverse movement of the heads upon engagement of the clutch teeth 104 and, at the same time, the shaft 241 is also actuated to cause movement of the clutches to an engagement with the traverse drive as aforesaid.

Such movement of the switch is effected by a counterclockwise rotation (Fig. 2) of the crank 264 which, through engagement with the rod 261, retracts the rod downwardly against spring tension and the rod is so held in such downward position for a predetermined time by means of a timing controlling mechanism driven from the secondary index drive shaft 60, which shaft has formed thereon a worm 270 driving a worm wheel 271 and a connected gear 272 (Figs. 10 and 11) which in turn mesh with a gear 273, which has formed thereon clutch teeth 274 adapted for periodic engagement with clutch teeth 275 of the rod controlling cam 262. The cam 262 is normally urged towards the gear 273 by a spring 277, which thus normally engages the clutch teeth to cause rotation thereof with rotation of the gear 272 from the shaft 60. Such engagement is, however, precluded during the indexing cycle by the interrelation of the rods 261 and 242. When the rod 242 is in inward position, during the indexing cycle, the crank 264 is in a clockwise rotated position and holds up the rod 261, a projection 278 of which bears against a tapered surface 279 on the cam, thus holding the cam against the tension of the spring 277 and out of engagement with the clutch teeth 274.

Near the end of the indexing movement, as aforesaid, the rod moves outwardly, gradually forcing the switch into neutral position and gradually retracting the rod 261 downwardly until such time as the upper end of the projection 278 moves out from its engagement with the gear's tapered surface 279, permitting engagement of the clutch teeth, whereupon the cam 262 will rotate with the gear 273 moving the high spot of the cam downwardly to engage a roller 280 on the rod 261; the engagement thereof being in sequence with the final outward movement of the rod 242, which throws the switch for a reversed drive of the motor 35 and which throws the feed works actuating members. It is desired, however, to maintain this direction of rotation of the motor only for a predetermined time sufficient to permit all the heads to complete their down traverse movement, such timing is provided for by the contour of the raised portion of the cam 262, which, being rotated from the main motor, holds the rod down for a predetermined length of time. Upon passing the high spot, the rod moves upwardly under tension of a spring 265, thus rocking the crank 264 in clockwise direction and, at the same time, controlling the projection 278 of the rod 261 to force outwardly the cam from engagement with the clutch teeth so that it remains stationary until the next indexing cycle.

*Operation*

In the normal operation of the machine, after a period of work, the machine is shut down by the manipulation of the handle 285 which causes the link 282 to abut the stop 281 and preclude further indexing of the machine. The handle may be thrown out any time during the working cycle and, thus, the arrangement is such that the machine will continue throughout the working cycle and will automatically stop with all of the heads in the up-raised position and the index clutch element 157 released with respect to the control rods 154. At such point in the operation, both motors 34 and 35 will be in operation and, in closing down the machine, the stop button in one of the switch boxes 36 may be pressed to stop both the motors, it being understood that the circuit is preferably such that the holding circuit for the motor 35 is dependent upon the operation of the motor 34.

In restarting the machine, after it has been shut down in the manner set forth, the operator first pushes the start button in one of the switch boxes which will energize the motor 34, but which will not energize the motor 35, the control circuit being such that manipulation of the switch 260 is required to inaugurate the operation of the motor 35 after which inauguration it follows its cycle of operation by the control of the switch 260. Inasmuch as the specific electrical circuits from the several switch boxes to the motors 34 and 35 form no part of the invention claimed herein, these have not been illustrated or described in detail. The functions of the various operations throughout the cycle, after the inauguration of the main motor 34, are as follows:

1. The handle 285 is manipulated to withdraw the link 282 from the stop 281, and the index clutch spring 158 of the clutch element acts to rotate the clutch element 157 with respect to the element 160, thus starting the revolution of the indexing sleeve 162. The indexing cycle thus started refers to the time required for the indexing sleeve 162 to make one complete revolution in the case of single index, or two complete revolutions in the case of double index, it being understood that the indexing sleeve has a free period of motion both before and after the actual indexing movement of the carrier; this being obtained by the fact that the crank 167 is normally at rest in a position disengaged from the carrier as illustrated in Figure 2 and is effective to shift the carrier during only a portion of its rotation.

2. As the indexing sleeve 162 revolves, the binder cam 180 releases the pressure applied by the yoke 183 upon the binder pins 184 and, simultaneously therewith, the cam 176 permits the lock pin 170 to withdraw from the engaged lug 171.

3. Upon further revolution of the indexing sleeve 162, the crank 167 engages the carrier and starts the actual indexing movement thereof.

4. With such movement of the indexing sleeve 162, the cam 245 rotates to move the switch 260 to break the circuit to the motor 35 and, in this connection, it will be noted, as aforesaid, that on the first cycle of operation, after a period of rest, there is no energization of the motor 35 until later on in the cycle of operation. However, in normal, continuous operation, the traverse motor 35 is permitted to run in up-traverse direction until the cam 245 moves the switch 260 to disconnect the motor, which movement, as aforesaid, is in conjunction with the beginning of the carrier rotation.

5. During the initial operation of the indexing sleeve and prior to the time the carrier is being indexed, the plate 194 raises the spindle drive gears 191 and the spindle locking gear 210 out of the plane of the intermediate gear 197 to permit the carrier to freely index to the next station without danger of gear clashing.

6. The indexing movement of the carrier is then brought about and completed and, with the carrier in its newly indexed position, the lock pin 170 is engaged with the alined bit 171 on the carrier by the spring 172 as permitted by the movement of the cam 176.

7. Simultaneously with function No. 6, binder pressure is applied by the binder cam 180.

8. Further rotation of the indexing sleeve 162 causes upward movement of the plate 204, thus to move the cone clutch devices 203 into engagement with the gears 197 to inaugurate frictional drive for the spindles.

9. Continued movement of the indexing sleeve 162 brings about the retraction of the cones from gears 197.

10. As the spindles are brought up to speed by the friction drive further indexing movement of the indexing sleeve 162 lowers the plate 194 and permits the gears 191 to drop into the position shown in Figure 2 for positively driving the spindles therefrom.

11. With the carrier in its newly indexed position, the cam 236 acts to raise the chuck operating gear 228 into engagement with the spindle chuck operating gear 229 whereupon the foot element 227 may be operated to throw the clutch 225 to control the opening or closing of the chuck jaws.

12. Near the conclusion of the indexing movement of the indexing sleeve 162, the cam 245 moves outwardly the rod 242 to move the switch 260 to energize the traverse motor 35 in down traverse direction.

13. With such movement of the rod 242, the push rod 261 is lowered whereby the worm wheel 271 releases the cam 262 and clutches it with the gear 273 for a continued rotation of the cam 262 from the main motor. The configuration of the cam 262 is such as to hold the switch 260 in position for down traverse energization of the motor 35 for a predetermined length of time independent of the various feed works and the various lengths of traverse movement applied therefrom to the heads but sufficient to provide for the maximum traverse movement desired.

14. With the outward movement of the rod 242 by cam 245, the links 144 are moved, thus to throw the feed works clutches 98 upwards to engage the traverse gear and thus to inaugurate down traverse of the heads.

15. With the rotation of the feed screws 100, through the engagement of the clutch 98 with the traverse gear, as aforesaid, the recesses 153 are rotated, thus moving the control rods into the path of projections 156 on the element 157 of the index clutch and thus restraining this element against further rotation and disconnecting its clutch engagement with the lower index clutch element 160 and thereby ending the index cycle.

16. As the various heads come to the end of their down traverse, they are, independently of each other, tripped into feed by the engagement of the finger 120A with the lug 120B and the subsequent action of the cam 134, which, as aforesaid, acts to shift the clutch 98 into engagement with the feed gear 95, it being understood that the length of traverse and the length and speed of the feed are independently determined through the independent feed works mechanism provided for each tool head.

17. After the expiration of a predetermined period of time, which is ample to provide for the full traverse period for the longest down-traverse movement of any head, the continued rotation of the cam 262 moves the switch 260 to stop the motor 35.

18. Further rotation of the cam 262 holds the switch 260 in neutral position for a predetermined period.

19. After the above predetermined period, the spring 265 under control of the cam 262 moves the switch 260 to energize the motor 35 in up-traverse direction in which position the switch 260 is left until the beginning of the next indexing cycle except in the event of the main motor being shut off which, as aforesaid, automatically shuts off the motor 35.

20. As each head finishes its feeding stroke, the cam mechanism of its feed works operates through the cams on the cam disk 120 to throw the clutch again into engagement with the traverse gear 102 which, through the reversal of the motor 35 by a control of the switch 260 from the cam 262, is now rotating in a direction to move the head upwardly at traverse speed.

21. As each head comes to its upper starting position, the cams on the timing disc act to disengage the traverse clutch, and simultaneously the recesses 153 of the index control plates 150 permit the control rods 154 to be withdrawn so that, as the last head arrives in its full upward position, the index clutch element will be fully released to permit a new indexing cycle starting from the function No. 1 herein enumerated. If, during the cycle, the handle 285 has been manipulated to lock the indexing clutch element 157, then both motors will continue running without any further functioning of the machine which otherwise automatically continues through a repetition of the cycles enumerated.

From the above description of the operating functions, taken in conjunction with the detailed description of the mechanisms of the machine, it will be clear that the machine provides a readily adjustable, automatic high speed machine well adapted to carry out the objects of the invention. Throughout this description, it is to be understood that the functions, in many instances, overlap each other in time of operation, and wherein the word "simultaneously" has been used, it is obvious that timing adjustments of the machine, in many instances, may provide for a function being slightly in advance of, or slightly behind another function which is herein described as taking place simultaneously. It is, therefore, to be understood that various adjustments in the timing cycle may be made without departing from the general statement of operation herein given by way of illustration.

It is also to be understood that throughout the entire description of the structure, as well as the operation, numerous changes and modifications, and the full use of equivalents, may be resorted to without departing from the spirit or scope of the invention as outlined in the appended claims.

We claim:

1. In a machine tool, an indexable carrier, a plurality of work carrying spindles rotatably mounted therein, a plurality of continuously driven shafts arranged to successively drive said spindles, and a single gear train for each shaft each embodying a pair of removable gears for continuously rotating said shafts at independent speeds.

2. In a machine tool, the combination with an indexable carrier and a plurality of rotatable work holding spindles mounted therein of a plurality of continuously rotated spindle driving shafts each driven through an independent gear train including a pair of removable gears changeable to vary the speed of drive to the shaft, a gear on each shaft and spindle driving gears indexable with the carrier to establish driving connection between said shaft gears and said spindle gears.

3. In a machine tool, the combination with an indexable carrier having a plurality of rotatable work holding spindles mounted therein of a plurality of continuously driven spindle driving shafts, a single gear train including a pair of removable gears associated with each shaft for driving said shafts from a single source of power at independent speeds and means for driving each spindle successively from two or more of said shafts.

4. In a machine tool, the combination with a central driving shaft of a plurality of continuously driven spindle driving shafts each driven therefrom at independent speeds through a single gear train including a pair of removable gears associated with each shaft, an indexable carrier, work holding spindles mounted therein, a single gear on each shaft for establishing driving connection between said shaft and said spindles, whereby each spindle may be successively driven from two or more of said shafts.

5. In a machine tool, an indexable carrier, a plurality of spindles mounted therein, a single source of power for driving all of said spindles, a plurality of spindle driving shafts, an independent gear train connection for each shaft each receiving the same speed of drive from said source of power and each capable of delivering an independent speed drive to continuously drive its shaft at a speed which may be other than the speed of another shaft, a gear on each shaft, a spindle driving gear for each spindle indexable therewith and means for establishing enmeshment of the gears of said shaft with the spindle driving gears so as to drive each spindle successively from two or more of said shafts.

6. In a machine tool, a plurality of tool heads, a plurality of shafts adapted to be continuously driven at speeds which may be independent, one from another, means for moving the tool heads therefrom, an indexable carrier, a plurality of spindles carried thereby and means for driving each spindle successively from two or more of said shafts.

7. In a machine tool, a plurality of tool heads, a plurality of shafts adapted to be continuously driven at speeds which may be independent, one from another, means for moving the tool heads therefrom, an indexable carrier, a plurality of spindles carried thereby and means for driving each spindle successively from each shaft.

8. In a machine tool, a plurality of tool heads, a plurality of shafts adapted to be continuously driven at speeds which may be independent, one from another, means for moving the tool heads therefrom, an indexable carrier, a plurality of spindles carried thereby, means for driving each spindle successively from two or more of said shafts and a single source of power for continuously driving all of said shafts.

9. In a machine tool, a plurality of tool heads, a plurality of shafts adapted to be continuously driven at speeds which may be independent, one from another, means for moving the tool heads therefrom, an indexable carrier, a plurality of spindles carried thereby, means for driving each spindle successively from two or more of said shafts, a single source of power for continuously driving all of said shafts, and means for moving tool heads independently of said single source of power.

10. In a machine tool, a plurality of tool heads, a plurality of shafts adapted to be continuously driven at speeds which may be independent, one from another, means for moving the tool heads therefrom, an indexable carrier, a plurality of spindles carried thereby, means for driving each spindle successively from two or more of said shafts and means for individually varying the speed of said continuously driven shafts.

11. In a machine tool, a plurality of tool heads, a plurality of shafts adapted to be continuously driven at speeds which may be independent, one from another, means for moving the tool heads therefrom, an indexable carrier, a plurality of spindles carried thereby, means for driving each spindle successively from two or more of said shafts and a single source of power for continuously driving all of said shafts and means for individually varying the speed of said continuously driven shafts.

12. In a machine tool, a plurality of tool heads, a plurality of shafts adapted to be continuously driven at speeds which may be independent, one from another, means for moving the tool heads therefrom, an indexable carrier, a plurality of spindles carried thereby, means for driving each spindle successively from two or more of said shafts and a single source of power for continuously driving all of said shafts, means for individually varying the speed of said continuously driven shafts and means for varying the speed of said single source of power.

13. In a machine tool, a plurality of shafts adapted to be continuously driven, an indexable carrier, a plurality of spindles carried thereby and means for driving each spindle successively from two or more of said shafts, said means including both positive and frictional driving means for establishing drive between each shaft and each spindle.

14. In a machine tool, a plurality of shafts adapted to be continuously driven, an indexable carrier, a plurality of spindles carried thereby and means for driving each spindle successively from two or more of said shafts, said means including both positive and frictional driving means for establishing drive between each shaft and each spindle and being operable with the indexing of said carrier.

15. In a machine tool, a plurality of shafts adapted to be continuously driven, an indexable carrier, a plurality of spindles carried thereby and means for driving each spindle successively from two or more of said shafts, each shaft having means for delivering either frictional or positive drive therefrom to a spindle.

16. In a machine tool, a plurality of shafts adapted to be continuously driven, means for moving tool heads therefrom, an indexable carrier, a plurality of spindles carried thereby and means for driving each spindle successively from two or more of said shafts, said means including both positive and frictional driving means for establishing drive between each shaft and each spindle.

17. In a machine tool, a plurality of shafts adapted to be continuously driven, means for moving tool heads therefrom, an indexable carrier, a plurality of spindles carried thereby and means for driving each spindle successively from two or more of said shafts, said means including both positive and frictional driving means for establishing drive between each shaft and each spindle and being operable with the indexing of said carrier.

18. In a machine tool, a plurality of shafts adapted to be continuously driven, means for moving tool heads therefrom, an indexable carrier, a plurality of spindles carried thereby and means for driving each spindle successively from two or more of said shafts, said means including both a gear drive and a frictional drive for establishing driving connections between each shaft and each spindle.

19. In a machine tool, a plurality of shafts adapted to be continuously driven, means for moving tool heads therefrom, an indexable carrier, a plurality of spindles carried thereby and means for driving each spindle successively from two or more of said shafts, said means including both a gear drive and a frictional drive for establishing driving connections between each shaft and each spindle and means operable with the indexing of said carrier to successively establish driving connections from said frictional drive and said gear drive.

20. In a machine tool, a plurality of individually and continuously driven shafts, means for moving tool heads therefrom, an indexable carrier, a plurality of spindles carried thereby and means for driving each spindle successively from two or more of said shafts, said means including both a gear drive and a frictional drive for establishing driving connections between each shaft and each spindle, means operable with the indexing of said carrier to successively establish driving connections from said frictional drive and said gear drive and a single source of power for driving said shafts and for indexing said carrier, means for varying the speed of the indexing with respect to the speed of said source of power, and auxiliary means for moving the tool heads independently of said source of power.

21. In a machine tool, a plurality of shafts adapted to be continuously driven, an indexable carrier, a plurality of spindles carried thereby, means for progressively driving the spindles from said shafts, a plurality of tool heads arranged to operate upon work carried by the spindles and means for driving the tool heads from said shafts and at variable speeds with respect thereto.

22. In a machine tool, a plurality of driven shafts, an indexable carrier, a plurality of spindles carried thereby, means for progressively driving the spindles from said shafts, a plurality of tool heads arranged to operate upon work carried by the spindles, means for driving the tool heads from said shafts and means for moving the tool heads independent of said shafts.

23. In a machine tool, a plurality of shafts adapted to be continuously driven, an indexable carrier, a plurality of spindles carried thereby, means for progressively driving the spindles from said shafts, a plurality of tool heads arranged to operate upon work carried by the spindles and means for driving the tool heads from said shafts, said means including instrumentalities for varying the speed of movement of said heads when driven from said shafts with respect to the speed of rotation of said shafts.

24. In a machine tool, a plurality of driven shafts, an indexable carrier, a plurality of spindles carried thereby, means for progressively driving the spindles from said shafts, a plurality of tool heads arranged to operate upon work carried by the spindles and means for driving the tool heads from said shafts, said means including instrumentalities for varying the speed of movement of said heads when driven from said shafts with respect to the speed of rotation of said shafts, and means for moving the tool heads independent of said shafts.

25. In a machine tool, a plurality of driven shafts, an indexable carrier, a plurality of spindles carried thereby, means for progressively driving the spindles from said shafts, a plurality of tool heads arranged to operate upon work carried by the spindles, means for driving the tool heads from said shafts, means for independently varying the speed of said tool heads with respect to the shafts when they are driven thereby and variable speed means for moving the tool heads independently of said shafts.

26. In a multiple spindle indexing type machine tool, a source of power, means for driving a plurality of shafts from said source of power, a plurality of tool heads operable by said shafts, a carrier, a plurality of work holding spindles mounted therein, means for both frictionally and positively driving said spindles from said continuously rotated shafts, and auxiliary means for moving said tool heads independently of said shafts.

27. In a multiple spindle indexing type machine tool, a source of power, means for continuously driving a plurality of shafts from said source of power, a plurality of tool heads operable by said shafts, a carrier, a plurality of work holding spindles mounted therein, means for both frictionally and positively driving said spindles from said continuously rotated shafts, variable speed means for indexing said carrier from said source of power and means independent of said aforementioned source of power for moving said tool heads.

28. In a multiple spindle indexing type machine tool, a source of power, means for continuously driving a plurality of shafts from said source of power at independently variable speeds, a plurality of tool heads operable by said shafts, a carrier, a plurality of work holding spindles mounted therein, means for both frictionally and positively driving said spindles from said continuously rotated shafts, means for indexing said carrier from said source of power and means independent of said aforementioned source of power for moving said tool heads, said last mentioned means including an instrumentality for varying the speed thereof.

29. In a multiple spindle indexing type machine tool, a source of power, means for continuously driving a plurality of shafts from said source of power at independently variable speeds, a plurality of tool heads operable by said shafts, a carrier, a plurality of work holding spindles mounted therein, means for either frictionally or positively driving said spindles from said continuously rotated spindles, means for indexing said carrier from said source of power, said last mentioned means being variable in speed with respect to the speed of said source of power and means for driving the tool heads independently of said shafts, said means including an instrumentality for varying the speed of said independent drive.

30. In a multiple spindle indexing type machine tool, a source of power, means for continuously driving a plurality of shafts from said source of power, a plurality of tool heads operable by said shafts at speeds independently variable with respect to the speeds of said shafts, a carrier, a plurality of work holding spindles mounted therein and means for either frictionally or positively driving said spindles successively from said shafts.

31. In a multiple spindle indexing type machine tool, a source of power, means for continuously driving a plurality of shafts from said source of power at independent speeds, a plurality of tool heads operable by said shafts at speeds independently variable with respect to the speeds of said shafts, a carrier, a plurality of work holding spindles mounted therein, means for both frictionally and positively driving said spindles successively from said shafts.

32. In a multiple spindle indexing type machine tool, a source of power, means for driving a plurality of shafts from said source of power, a plurality of tool heads operable by said shafts at speeds independently variable with respect to the speeds of said shafts, a carrier, a plurality of work holding spindles mounted therein, means for both frictionally and positively driving said shafts from said continuously rotated spindles, means for indexing said carrier from said source of power and means independent of said aforementioned source of power for moving said tool heads.

33. In a multiple spindle indexing type machine tool, a source of power, means for continuously driving a plurality of shafts from said source of power at independently variable speeds, a plurality of tool heads operable by said shafts at speeds independently variable with respect to the speeds of said shafts, a carrier, a plurality of work holding spindles mounted therein, means for both frictionally and positively driving said spindles from said continuously rotated shafts, means for indexing said carrier from said source of power, said last mentioned means being variable in speed with respect to the speed of said source of power and means for driving the tool heads independently of said shafts, said means including an instrumentality for varying the speed of said independent drive.

34. In a machine tool, a continuously running source of power, a plurality of spindle driving shafts continuously operated therefrom, an indexable carrier, a plurality of work holding spindles mounted therein, an indexing mechanism for said carrier operated from said source of power, means for establishing driving connection between said shafts and said spindles and an actuator for said means operable by the indexing mechanism.

35. In a machine tool, a continuously running source of power, a plurality of spindle driving shafts continuously operated at variable speeds therefrom, an indexable carrier, a plurality of work holding spindles mounted therein, an indexing mechanism for said carrier operated from said source of power, means for establishing driving connection between said shafts and said spindles and an actuator for said means operable by the indexing mechanism, said means for establishing driving connection including both positive and frictional driving devices.

36. In a machine tool, a continuously running source of power, a plurality of spindle driving shafts continuously operated therefrom, an indexable carrier, a plurality of work holding spindles mounted therein, an indexing mechanism for said carrier operated from said source of power, means for establishing driving connection between said shafts and said spindles and an actuator for said means operable by the indexing mechanism, said means for establishing driving connection including both positive and frictional driving devices, both being synchronously operated with the indexing mechanism.

37. In a machine tool, a continuously running source of power, a plurality of spindle driving shafts continuously operated at variable speeds therefrom, an indexable carrier, a plurality of work holding spindles mounted therein, an indexing mechanism for said carrier operated from said source of power, means for establishing driving connection between said shafts and said spindles, an actuator for said means operable by the indexing mechanism and means operable with said indexing mechanism for securing the carrier in its indexed position.

38. In a machine tool, a continuously running source of power, a plurality of spindle driving shafts continuously operated therefrom, an indexable carrier, a plurality of work holding spindles mounted therein, an indexing mechanism for said carrier operated from said source of power, means for establishing driving connection between said shafts and said spindles, and means operable with said indexing mechanism for securing the carrier in its indexed position, said means including a lock pin operable by and with the actuation of the indexing mechanism.

39. In a machine tool, a continuously running source of power, a plurality of spindle driving shafts operated therefrom, an indexable carrier, a plurality of work holding spindles mounted therein, an indexing mechanism for said carrier operated from said source of power, means for establishing driving connection between said shafts and said spindles, and means operable with said indexing mechanism for securing the carrier in its indexed position, said means including a frictional binding device operable with the indexing mechanism to frictionally engage the carrier.

40. In a machine tool, a source of power, a plurality of spindle driving shafts operated therefrom, an indexable carrier, a plurality of work holding spindles mounted therein, an indexing mechanism for said carrier, means for establishing driving connection between said shafts and said spindles, and means operable with said indexing mechanism for securing the carrier in its indexed position, said means including a lock pin operable by and with the actuation of the indexing mechanism and including a frictional binding device operable with the indexing mechanism to frictionally engage the carrier.

41. In a machine tool, a source of power, a plurality of spindle driving shafts operated therefrom, an indexable carrier, a plurality of work holding spindles mounted therein, an indexing mechanism for said carrier, means for establishing driving connection between said shafts and said spindles, an actuator for said means operable by the indexing mechanism, means operable with said indexing mechanism for securing the carrier in its indexed position, said means including a lock pin operable by and with the actuation of the indexing mechanism and a plurality of independently adjustable engaging elements mounted on said carrier.

42. In a machine tool, a continuously running source of power, a plurality of spindle driving shafts continuously operated at variable speeds therefrom, an indexable carrier, a plurality of work holding spindles mounted therein, an indexing mechanism for said carrier operated from said source of power, independently adjustable means on said carrier for adjusting the indexing movement thereof in response to the movement of said mechanism, means for establishing driving connection between said shafts and said spindles and an actuator for said means operable with the indexing mechanism.

43. In a machine tool, a source of power, a plurality of spindle driving shafts operated therefrom, an indexable carrier, a plurality of work holding spindles mounted therein, each spindle being independently adjustable within said carrier, an indexing mechanism for said carrier operated from said source of power, means for establishing driving connection between said shafts and said spindles and an actuator for said means operable with the indexing mechanism.

44. In a machine tool, a continuously running source of power, a plurality of spindle driving shafts continuously operated at variable speeds therefrom, an indexable carrier, a plurality of work holding spindles mounted therein, each spindle being independently adjustable within said carrier, an indexing mechanism for said carrier operated from said source of power, independently adjustable means on said carrier for adjusting the indexing movement thereof in response to the movement of said mechanism, means for establishing driving connection between said shafts and said spindles, an actuator for said means operable with the indexing mechanism, means operable with said indexing mechanism for securing the carrier in its indexed position, said means including a lock pin operable by and with the actuation of the indexing mechanism and a plurality of independently adjustable engaging elements mounted on said carrier.

45. In a multiple spindle indexing type machine tool, a continuous source of power, a plurality of shafts independently driven at variable speeds thereby, an indexable carrier, a plurality of spindles mounted in said carrier, means for periodically driving said spindles from said shafts, a plurality of tool heads, one associated with each shaft, means for periodically driving each tool head from its shaft and means for periodically driving each tool head independent of its shaft.

46. In a multiple spindle indexing type machine tool, a continuous source of power, a plurality of shafts continuously driven at independently variable speeds thereby, an indexable carrier, a plurality of spindles mounted in said carrier, means for periodically driving said spindles from said shafts, a plurality of tool heads, one associated with each shaft, means for periodically driving each tool head from its shaft, means for periodically driving each tool head independent of its shaft and means varying the rate of speed of said source of power.

47. In a multiple spindle indexing type machine tool, a continuous source of power, a plurality of shafts independently driven at variable speeds thereby, an indexable carrier, a plurality of spindles mounted in said carrier, means for periodically driving said spindles from said shafts, a plurality of tool heads, one associated with each shaft, means for periodically driving each tool head from its shaft, means for periodically driving each tool head independent of its shaft and means for varying the rate of movement of the tool head when driven from its shaft independent of the rate of rotation of said shaft.

48. In a multiple spindle indexing type machine tool, a continuous source of power, a plurality of shafts independently driven at variable speeds thereby, an indexable carrier, a plurality of spindles mounted in said carrier, means for periodically driving said spindles from said shafts, a plurality of tool heads, one associated with each shaft, means for periodically driving each tool head from its shaft, means for periodically driving each tool head independent of its shaft and means for varying the speed of rotation of said independent drive for said tool heads.

49. In a multiple spindle indexing type machine tool, a continuous source of power, a plurality of shafts independently driven at variable speeds thereby, an indexable carrier, means for indexing said carrier driven from said continuous source of power, a plurality of spindles mounted in said carrier, means for periodically driving said spindles from said shafts, a plurality of tool heads, one associated with each shaft, means for periodically driving each tool head from its shaft and means for periodically driving each tool head independent of its shaft.

50. In a multiple spindle indexing type machine tool, a continuous source of power, a plurality of shafts independently driven at variable speeds thereby, an indexable carrier, means for indexing said carrier driven from said continuous source of power, a plurality of spindles mounted in said carrier, means for periodically driving said spindles from said shafts, a plurality of tool heads, one associated with each shaft, means for periodically driving each tool head from its shaft, means for periodically driving each tool head independent of its shaft and means for varying the rate of said drive for said means for indexing independent of the speed of said source of power.

51. In a multiple spindle indexing type machine tool, a continuous source of power, a plurality of shafts independently driven at variable speeds thereby, an indexable carrier, means for indexing said carrier driven from said continuous source of power, a plurality of spindles mounted in said carrier, means for periodically driving said spindles from said shafts, a plurality of tool heads, one associated with each shaft, means for periodically driving each tool head from its shaft, means for periodically driving each tool head independent of its shaft, means for varying the rate of said drive for said means for indexing independent of the speed of said source of power and independent means for varying the speed of said source of power as applied to said shafts.

52. In a machine tool, the combination with an indexable carrier and a plurality of work spindles mounted therein of tool heads for said spindles and independent continuously moving sources of power for rotating each spindle and for moving the associated tool head in its feeding movement, means for individually varying the rate of speed applied from each source of power to each individual tool head and the spindle associated therewith and means for simultaneously varying the rate of all of said sources of power as applied to all the tool heads and spindles associated therewith.

53. In a machine tool, the combination with an indexable carrier and a plurality of work spindles mounted therein of tool heads for said spindles and independent continuously moving sources of power for rotating each spindle and for moving the associated tool heads in their feeding movement, means for individually varying the rate of speed applied from each source of power to each individual tool head and the spindle associated therewith and an independent source of power for moving the tool heads in their non-feeding movements.

54. In a machine tool, the combination with an indexable carrier and a plurality of work spindles mounted therein of tool heads for said spindles and a source of power for rotating said spindles and for moving the tool head in their feeding movements, means for individually varying the rate of speed applied from said source of power to each individual tool head and the spindle associated therewith, an independent reversible source of power for moving the tool heads in their non-feeding movements and means for varying the rate of speeds of said last mentioned source of power.

55. In a machine tool including an indexable carrier, an indexing mechanism, work holding spindles mounted in said carrier and tool heads operable upon work carried by said spindles of a single continuously rotating motor for driving said spindles and tool heads and for driving said indexing mechanism and means for varying the speed of drive of said indexing mechanism, independent of the drive from said motor to said spindles and tool heads.

56. In a machine tool including an indexable carrier, an indexing mechanism, work holding spindles mounted in said carrier and tool heads operable upon work carried by said spindles of a single continuously rotating motor for driving said spindles and tool heads and for driving said indexing mechanism and means for varying the drive from said motor for said spindles and tool heads independent of the drive of said indexing mechanism.

57. In a machine tool including an indexable carrier, an indexing mechanism, work holding spindles mounted in said carrier and tool heads operable upon work carried by said spindles of a single continuously rotating motor for driving said spindles and to heads and for driving said indexing mechanism and an independent motor for driving said tool heads during a portion of their movement.

58. In a machine tool including an indexable carrier, an indexing mechanism, work holding spindles mounted in said carrier and tool heads operable upon work carried by said spindles of a single continuously rotating motor for driving said spindles and tool heads and for driving said indexing mechanism, an independent motor for driving said tool heads during a portion of their movement and means for varying the speed applied to said tool heads from said second mentioned motor.

59. In a machine tool including an indexable carrier, an indexing mechanism, work holding spindles mounted in said carrier and tool heads operable upon work carried by said spindles of a single continuously rotating motor for driving said spindles and tool heads and for driving said indexing mechanism, an independent motor for driving said tool heads during a portion of their movement and means for varying the speed applied to said indexing mechanism.

60. In a machine tool including an indexable carrier, an indexing mechanism, work holding spindles mounted in said carrier and tool heads operable upon work carried by said spindles of a single continuously rotating motor for driving said spindles and tool heads and for driving said indexing mechanism, an independent motor for driving said tool heads during a portion of their movement and means for varying the speed applied from said first mentioned motor for driving said spindles and said tool heads.

61. In a machine tool including an indexable carrier, an indexing mechanism, work holding spindles mounted in said carrier and tool heads operable upon work carried by said spindles of a single continuously rotating motor for driving said spindles and tool heads and for driving said indexing mechanism, an independent motor for driving said tool heads during a portion of their movement and means for varying the speed applied from said first mentioned motor for driving said spindles and said tool heads.

62. In a machine tool including an indexable carrier, an indexing mechanism, work holding spindles mounted in said carrier and tool heads operable upon work carried by said spindles of a single continuously rotating motor for driving said spindles and tool heads and for driving said indexing mechanism, an independent motor for driving said tool heads during a portion of their movement, means for varying the speed applied to said tool heads from said second mentioned motor and means for varying the speed applied to said indexing mechanism and means for varying the speed applied from said first mentioned motor for driving said spindles and said tool heads.

63. In a machine tool having an indexable carrier, a mechanism for indexing the same, work holding spindles in said carrier, a motor for driving said indexing mechanism and for rotating said spindles and moving said tool heads, a plurality of shafts for driving said spindles and moving said tool heads from said motor, a variable speed driving train from the motor to said shafts, means for independently and continuously rotating said shafts at variable speeds from said driving train, variable speed means for driving said indexing mechanism from said motor and a second motor for moving said tool heads independent of drive therefor from said first motor and means for varying the rate of speed applied to said tool heads from said second motor.

64. In a multiple spindle indexing type machine tool having tool heads and work spindles, an indexable carrier for said work spindles, a source of power, means for periodically indexing said carrier from said source of power, means for operating said tool heads intermittently between the indexing operations of said carrier and selectable means for varying the number of indexing operations between the operations of said tool heads.

65. In a multiple spindle indexing type machine tool having tool heads and work spindles, an indexable carrier for said work spindles, a source of power, means for periodically indexing said carrier from said source of power, means for operating said tool heads intermittently between the indexing operations of said carrier and selectable means for varying the number of indexing operations between the operations of said tool heads, said last mentioned means being capable of varying the timed relation between the indexing movement of the carrier and the operation of the tool heads.

66. In a machine tool, a plurality of individually and continuously driven shafts, means for moving tool heads therefrom, an indexable carrier, a plurality of spindles carried thereby, means for driving each spindle successively from two or more of said shafts, a single source of power for continuously driving all of said shafts, means for indexing said carrier one or more times from said source of power between each operation of said means for driving each spindle.

67. In a machine tool, a plurality of individually and continuously driven shafts, means for moving tool heads therefrom, an indexable carrier, a plurality of spindles carried thereby, means for driving each spindle successively from two or more of said shafts, a single source of power for continuously driving all of said shafts, tool heads actuating means operable by said shafts, means for indexing said carrier from said source of power and control means for said tool heads operable by said indexing means.

68. In a machine tool, a plurality of individually and continuously driven shafts, means for moving tool heads therefrom, an indexable carrier, a plurality of spindles carried thereby, means for driving each spindle successively from two or more of said shafts, a single source of power for continuously driving all of said shafts, tool heads actuating means operable by said shafts, means for indexing said carrier from said source of power and control means for said tool heads operable by said indexing means and adjustable to vary the timed relation between indexing and tool head operations.

69. In a machine tool, a plurality of individually and continuously driven shafts, means for moving tool heads therefrom, an indexable carrier, a plurality of spindles carried thereby, means for driving each spindle successively from two or more of said shafts, a single source of power for continuously driving all of said shafts, tool heads actuating means operable by said shafts, means for indexing said carrier from said source of power one or more times between each operation of said tool heads, and control means for said tool heads operable by said indexing means.

70. In a machine tool, a plurality of individually and continuously driven shafts, means for moving tool heads therefrom, an indexable carrier, a plurality of spindles carried thereby, means for driving each spindle successively from two or more of said shafts, a single source of power for continuously driving all of said shafts, tool heads actuating means operable by said shafts, means for indexing said carrier from said source of power one or more times between each operation of said tool heads, and control means for said tool heads operable by said indexing means, said control means being variable in response to the number of indexing operations between each operation of the tool heads.

71. In a multiple spindle indexing machine tool, a tool head, a spindle carrier, means for indexing said carrier, means operable by said indexing means for controlling operations of said tool head, said last mentioned means being variable to change the timed relation between the indexing and the operation of the tool heads.

72. In a machine tool, an indexable spindle carrier, an indexing shaft therefor and selective means for indexing said carrier one or more times upon a single cycle of operation of said indexing shaft, a tool head, means for controlling the operation of the tool head from the indexing shaft, and means for varying the timed relation between indexing and tool head control in accordance with the number of indexing operations made in one cycle of operation of said shaft.

73. In a machine tool, a plurality of individually and continuously driven shafts, means for moving tool heads therefrom, an indexable carrier, a plurality of spindles carried thereby, means for driving each spindle successively from two or more of said shafts, means for indexing said carrier, said last mentioned means being under the control of said tool heads.

74. In a machine tool, a plurality of individually and continuously driven shafts, means for moving tool heads therefrom, an indexable carrier, a plurality of spindles carried thereby, means for driving each spindle successively from two or more of said shafts, means for indexing said carrier, said last mentioned means being under the control of said tool heads through a releasable clutch restrained by said tool heads, each tool head having independently adjustable means for releasing its restraint on said clutch.

75. In a multiple spindle machine tool having an indexing chuck carrier capable of double or single indexing a pair of power chuck operators, each selectively operable at the will of the operator for opening or closing said chucks.

76. In a machine tool having an indexable work carrier and a tool head, an indexing drive for said carrier, a reversible drive for said tool head and means controlled by the indexing drive for reversing the drive for said tool head.

77. In a machine tool having an indexable work carrier and a tool head, a drive for indexing said carrier, a reversible motor for said tool head and a timing device for said motor controllable by said drive for indexing said carrier.

78. In a machine tool having an indexable work carrier and a tool head, a drive for indexing said carrier, a reversible motor for said tool head and a timing device for said motor controllable by said drive for indexing said carrier, and means independent of said drive for indexing for operating said timing device in response to its control by said drive for indexing.

79. In a machine tool having a main drive and an indexing mechanism periodically operated therefrom, an auxiliary drive, a timing controller therefor, means operable by the indexing mechanism to control the timing controller, and means independent of the indexing mechanism determining the duration of time cycle controlled by said timing controller.

80. In a machine tool, a plurality of individually and continuously driven shafts, means for moving tool heads therefrom, an indexable carrier, a plurality of spindles carried thereby, means for driving each spindle successively from two or more of said shafts, and means for individually and manually adjusting each tool head with respect to its drive.

81. In a machine tool, a plurality of individually and continuously driven shafts, means for moving tool heads therefrom, an indexable carrier, a plurality of spindles carried thereby, means for driving each spindle successively from two or more of said shafts, means for indexing said carrier, and manual means settable to restrain said means for indexing.

82. In a machine tool, a plurality of individually and continuously driven shafts, means for moving tool heads therefrom, an indexable carrier, a plurality of spindles carried thereby, means for driving each spindle successively from two or more of said shafts, and individual torque responsive devices acting to permit slippage of the tool head drives in response to excessive strain.

83. In a machine tool, a plurality of individually and continuously driven shafts, means for moving tool heads therefrom, an indexable carrier, a plurality of spindles carried thereby, means for driving each spindle successively from two or more of said shafts, and independent means for moving said tool head, said independent means including cushioning devices to preclude shock upon the application of power therefrom.

84. In a multiple spindle indexing type machine tool, a continuously operable main motor, a variable speed drive therefrom for an indexing mechanism, a variable speed drive therefrom for a plurality of drive shafts, a plurality of feed shafts each adapted to be driven at independent speeds from said second mentioned variable speed drives, a plurality of feed works each adapted to receive a drive from each shaft, variable speed means for supplying drive from each shaft to each feed works, an auxiliary reversible motor, a variable speed drive from said auxiliary motor to each of said feed works, a cushioning device in each feed works through which power from said auxiliary motor may be applied to the feed screw thereof, a torque responsive means through which power from said main motor may be applied to said feed works, a feed screw for each feed works, a clutch in each feed works for selectively applying drive to said feed works from said main motor or said auxiliary motor, self contained adjustable control means in each feed works for controlling said clutches, lost motion means for operating said control means so that the same is stationary during the major part of the operation of the feed screw by said main motor, an indexable work spindle carrier, an indexing shaft for indexing the same, a clutch for establishing drive to the indexing shaft from the variable speed drive for the indexing mechanism, a sheer pin in said variable speed drive for the indexing mechanism, individual adjustable releasable means in each feed works for restraining said clutch from engagement to establish drive for the indexing shaft, said last mentioned means acting to release said clutch when each feed works is in neutral position, tool heads associated with each feed screw whereby they are in raised inoperative position when said feed works are in neutral position, variable means for controlling the number of cycles of operation of said indexing shaft in response to one release of said indexing clutch, adjustable control means for said feed works operable at the expiration of the rotation of said indexing shaft, reversing control means for said auxiliary motor operable by said indexing shaft and jointly by the drive from the main motor drive for the indexing mechanism, a multiple chuck spindle carrying table, adjustable means for indexing said table by said indexing shaft, an adjustable locking device for said table operable by said indexing shaft, a binding device for said table operable by said shaft, friction and positive driving means for each spindle continuously driven from each shaft, means operable by said indexing shaft for applying first friction then positive drive from said driving means to said spindles, a loading station for applying work and removing work from the chucks of said spindles, a friction brake and a positive lock for the spindles at said loading stations, means for applying said brake and said lock in sequence, said means for applying being operable by said indexing shaft, a power chuck operator at said loading station receiving power from said main motor, automatic means operable by indexing of the carrier for connecting said operator with each spindle in the loading station and means under the control of the operator for applying reverse or forward drive from the main motor to said chuck.

85. In a multiple spindle indexing machine tool, an indexable spindle carrier, a plurality of rotatable spindles mounted therein, a plurality of shafts for successively driving the spindles, a continuously rotating source of power, means for continuously driving said shafts therefrom, an indexing mechanism for said carrier and means for periodically operating said indexing mechanism from said continuously rotating source of power.

86. In a multiple spindle indexing machine tool, an indexable spindle carrier, a plurality of rotatable spindles mounted therein, a plurality of shafts for successively driving the spindles, a continuously rotating source of power, means for continuously driving said shafts therefrom, an indexing mechanism for said carrier and means for periodically operating said indexing mechanism from said continuously rotating source of power, said means including a timing mechanism for controlling the duration of the drive from said source of power to said indexing mechanism.

87. In a multiple spindle indexing machine tool, an indexable spindle carrier, a plurality of rotatable spindles mounted therein, a plurality of shafts for successively driving the spindles, a continuously rotating source of power, means for continuously driving said shafts therefrom, an indexing mechanism for said carrier, means for periodically operating said indexing mechanism from said continuously rotating source of power, said means including a timing mechanism for controlling the duration of the drive from said source of power to said indexing mechanism and adjustable means for varying the time of operation of said timing mechanism.

88. In a multiple spindle indexing machine tool, an indexable spindle carrier, a plurality of rotatable spindles mounted therein, a plurality of shafts for successively driving the spindles, a continuously rotating source of power, means for continuously driving said shafts therefrom, an indexing mechanism for said carrier and means for periodically operating said indexing mechanism from said continuously rotating source of power, said means being variable to selectively index said carrier either once or a plurality of times during one single operation thereof.

89. In a multiple spindle indexing machine tool, an indexable spindle carrier, a plurality of rotatable spindles mounted therein, a plurality of shafts for successively driving the spindles, a continuously rotating source of power, means for continuously driving said shafts therefrom, an indexing mechanism for said carrier and means for periodically operating said indexing mechanism from said continuously rotating source of power, said means being variable to selectively index said carrier either once or a plurality of times during one single operation thereof and further including a variable timing mechanism adjustable in accordance with the number of indexing operations performed during one cycle of indexing drive from said source of power.

90. In a machine tool, an indexing spindle carrier, a plurality of work holding spindles mounted therein, a plurality of continuously driven shafts arranged to successively drive said spindles, a plurality of tool heads for operating upon work carried by said spindles, means for periodically operating said tool heads from said shafts and means for periodically operating said tool heads independently of said shafts.

91. In a machine tool, an indexing spindle carrier, a plurality of work holding spindles mounted therein, a plurality of continuously driven shafts arranged to successively drive said spindles, a plurality of tool heads for operating upon work carried by said spindles, means for periodically operating said tool heads from said shafts and means for periodically operating said tool heads independently of said shafts, said last mentioned means including a reversible motor.

92. In a machine tool, an indexing spindle carrier, a plurality of work holding spindles mounted therein, a plurality of continuously driven shafts arranged to successively drive said spindles, a plurality of tool heads for operating upon work carried by said spindles, means for periodically operating said tool heads from said shafts, means for periodically operating said tool heads independently of said shafts, said last mentioned means including a reversible motor, and a reversing mechanism controlled by said heads.

EDWARD P. BULLARD.
EDWARD C. BULLARD.
EDWARD P. BULLARD, III.
GUSTAF R. APPELBERG.
ERNEST H. JOHNSON.
FRANK H. MUSSLER.